United States Patent [19]
Storch et al.

[11] Patent Number: 5,283,422
[45] Date of Patent: Feb. 1, 1994

[54] INFORMATION TRANSFER AND USE, PARTICULARLY WITH RESPECT TO COUNTERFEIT DETECTION

[75] Inventors: Leonard Storch; Ernst van Haagen, both of New York, N.Y.

[73] Assignee: CIAS, Inc., New York, N.Y.

[21] Appl. No.: 927,798

[22] Filed: Aug. 10, 1992

Related U.S. Application Data

[63] Continuation of Ser. No. 768,106, Sep. 30, 1991, abandoned, which is a continuation of Ser. No. 292,569, Dec. 30, 1988, abandoned, which is a continuation of Ser. No. 853,745, Apr. 18, 1986, Pat. No. 4,814,589.

[51] Int. Cl.$^5$ .................. G06K 7/10; G06F 15/44
[52] U.S. Cl. .................... 235/375; 235/437
[58] Field of Search ............ 235/383, 375, 437, 381

[56] References Cited

U.S. PATENT DOCUMENTS

| | | |
|---|---|---|
| D. 232,367 | 8/1974 | Garaventa . |
| D. 237,724 | 11/1975 | Garaventa . |
| D. 240,053 | 5/1976 | Garaventa . |
| 2,410,845 | 11/1946 | Snell et al. . |
| 2,983,354 | 5/1961 | Ember et al. . |
| 3,034,643 | 5/1962 | Keller et al. ............... 235/487 X |
| 3,106,706 | 10/1963 | Kolanowski et al. . |
| 3,109,990 | 11/1963 | Shuba . |
| 3,145,291 | 8/1964 | Brainerd . |
| 3,171,020 | 2/1965 | Lord . |
| 3,253,126 | 5/1966 | Baughman . |
| 3,350,802 | 11/1967 | Segel . |
| 3,409,760 | 11/1968 | Hamisch ..................... 235/494 |
| 3,421,148 | 1/1969 | Howells et al. . |
| 3,426,879 | 2/1969 | Walker . |
| 3,524,163 | 8/1970 | Weiss ........................ 235/437 X |
| 3,541,310 | 11/1970 | Stites . |
| 3,543,007 | 11/1970 | Brinker et al. . |
| 3,617,707 | 11/1971 | Shields et al. . |
| 3,636,317 | 1/1972 | Torrey . |
| 3,643,068 | 2/1972 | Mohan et al. . |
| 3,671,722 | 6/1972 | Christie . |
| 3,766,452 | 10/1973 | Burpee et al. . |
| 3,768,071 | 10/1973 | Knauft et al. . |
| 3,829,661 | 8/1974 | Silverman et al. . |
| 3,862,400 | 1/1975 | Thomson ..................... 235/494 X |

(List continued on next page.)

OTHER PUBLICATIONS

"Appendix C" and paragraph 2.4 of the Invitation for Bid for Optical Bar Code Readers of the Massachusetts State Lottery Commission, dated Apr. 4, 1989.
"Intermec Code 39, Alpanumeric Bar Code Specifications", 1986.
"UPC Symbol Specification" Uniform Product Code Council, Inc., Jun., 1979.

*Primary Examiner*—Robert A. Weinhardt
*Attorney, Agent, or Firm*—Rosen, Dainow & Jacobs

[57] ABSTRACT

Coding systems utilizing machine-readable coding are disclosed. The coding systems are extremely simple to use and preferred embodiments of the machine-readable coding require no external reference or reference code or starting point or orientation for reading or decoding. The number of usable codes for any given number of code elements (bits or digits) is maximized, or, conversely, a minimum number of code elements is required for a given application, thus allowing each code element to be of maximum size for a given coding area. Also, methods and apparatus for encoding objects, and for reading, decoding, processing and using the information obtained from such encoded objects are disclosed. The coding may be applied to objects such as casino chips, currency, automated production line components, consumer products, household items, zip coded objects, etc. The coding system and systems using the coding can be employed for enabling positive real-time detection of counterfeits (rather than mere counterfeit deterrence), cash monitoring, information gathering, object identification, etc., at minimum cost with maximum reliability and real-time speed. Preferred embodiments of systems concern round casino chips and paper money. Signals and data may be encoded independently of physical objects while obviating the need for any reference or synchronization in the coding.

16 Claims, 14 Drawing Sheets

U.S. PATENT DOCUMENTS

| | | |
|---|---|---|
| 3,882,482 | 5/1975 | Green et al. .................... 250/570 X |
| 3,890,599 | 6/1975 | Simjian . |
| 3,926,291 | 12/1975 | Burke et al. . |
| 3,953,932 | 5/1976 | Graves . |
| 3,968,582 | 7/1976 | Jones . |
| 3,983,646 | 10/1976 | Howard . |
| 3,987,278 | 10/1976 | Van Elzakker et al. . |
| 4,026,309 | 5/1977 | Howard . |
| 4,087,092 | 5/1978 | Krause et al. . |
| 4,139,219 | 2/1979 | Herndon . |
| 4,157,829 | 6/1979 | Goldman et al. . |
| 4,160,522 | 7/1979 | Dikinis . |
| 4,191,376 | 3/1980 | Goldman et al. . |
| 4,234,214 | 11/1980 | Lee . |
| 4,283,709 | 8/1981 | Lucero et al. ................... 235/375 X |
| 4,293,766 | 10/1981 | Long et al. . |
| 4,371,071 | 2/1983 | Abedor et al. . |
| 4,373,135 | 2/1983 | Mohan et al. ........................... 377/8 |
| 4,435,911 | 3/1984 | Jones . |
| 4,449,042 | 5/1984 | Hampson et al. . |
| 4,463,250 | 7/1984 | McNeight et al. . |
| 4,480,177 | 10/1984 | Allen . |
| 4,488,678 | 12/1984 | Hara et al. ........................... 235/463 |
| 4,493,989 | 1/1985 | Hampson et al. . |
| 4,506,914 | 3/1985 | Gobeli . |
| 4,509,632 | 4/1985 | Jaffe . |
| 4,514,815 | 4/1985 | Anderson ........................... 235/385 |
| 4,567,361 | 1/1986 | Rosenthal . |
| 4,605,846 | 8/1986 | Duret et al. . |
| 4,638,171 | 1/1987 | Gassmann ........................... 250/566 |

INFORMATION TRANSFER AND USE, PARTICULARLY WITH RESPECT TO COUNTERFEIT DETECTION

This application is a continuation of application Ser. No. 07/768,106, filed Nov. 30, 1991, now abandoned.

Application Ser. No. 07/768,106 is a continuation of application Ser. No. 07/292,569, filed Dec. 30, 1988, now abandoned.

Application Ser. No. 07/292,569 is a continuation of application Ser. No. 06/853,745 filed Apr. 18, 1986, now U.S. Pat. No. 4,814,589.

BACKGROUND OF THE INVENTION

The present invention relates generally to the transfer and use of information which may involve coding and/or decoding of the information. The information may be encoded in a signal and/or applied to objects. The invention also relates to objects having machine-readable coded information, to encoding objects with machine-readable information, to reading coded information from the objects, and to decoding coded information read from the objects and utilizing information obtained therefrom. The objects may be disc-like objects such as gambling chips, coins and tokens, and other objects such as production line components, commercial paper, currency, credit cards and food and consumer products. The information may be utilized for counting, identifying, denominating, dating, and/or pricing the objects, inventorying and/or for other purposes such as managing operations involving the use of the objects. More particularly, the invention relates to casino gambling chips and to methods and apparatus for automatically obtaining information relating to the chips and for utilizing the information obtained for purposes such as chip counting, chip identification, eliminating counterfeit chip losses, and chip, cash and casino operation management.

The invention disclosed herein has wide application to encoding, decoding and information transfer and use in connection with many types of objects and for many purposes. For example, the invention may be used with objects including, but not limited to the following: disc-like (i.e., generally flat, and generally round, elliptical or multi-sided) objects such as gambling chips, coins, tokens, etc.; generally circularly-shaped objects such as vehicle wheels and tires; commercial paper (checks, securities, etc.) and currency; products such as consumer products including food products sold in supermarkets, drugstores, hardware stores, etc.; labels and glass, paperboard, plastic and wrapped containers, etc., for many products including consumer products; etc. The invention may be used for purposes including, but not limited to the following: identification; object value (currency, gambling chip, token or security denomination, product price and/or cost, etc.); object counting; manufacturing purposes such as inventory control, mold or machine identification, location (plant, division, etc) identification, date information, etc. The invention is also widely applicable to many operations, activities and environments of use. However, the invention and its background are described herein in an exemplary sense primarily with respect to gambling chips and gambling establishments. It is to be understood, however, that it is not intended to limit the invention and its application to gambling chips, gambling operations and activities.

Revenues from gambling operations at a casino are produced by exchanging customers' money for gambling chips and providing gambling games for the customers so that they can wager their chips. Because of the house odds and the emotions involved in gambling, a casino shows a profit by winning back the chips. The essence of the casino's operations and revenues revolves around the casino s gambling chips. A task that requires considerable time, effort and care in the casino business is counting these chips, which is typically done after completing each operating shift, etc. Chip counting by denomination, in association with counting the cash received for the sale of chips, enables the casino to determine the approximate amount of money taken in at any gambling table, as well as by all or groups of tables in a given time period, and to monitor particular gambling tables or operators. Chip counting also enables a casino to determine the total number of chips available for play in the casino at a given time to ensure that a minimum number of chips are always available for play. By counting chips periodically, the casino can also determine the approximate number of chips which are either lost or taken as souvenirs over a given time period. This information may be used for planning purposes to ensure that the casino will always have an adequate supply of chips and for cash management purposes to determine the amount of money made or lost by the casino due to the loss or theft of chips and due to counterfeit chips.

Recently, efforts have been made to automate chip counting. See, for example, U.S. Pat. Nos. 3,983,646 and 4,026,309 (both of Howard) issued Oct. 5, 1976 and May 31, 1977, respectively, which disclose automatic counting of chips in chip racks independently of each other or by denomination.

Some operations, however, are still not automated. For example, detection of counterfeit and damaged chips or chips belonging to another casino is done visually. Although there have been efforts to provide chips with means so that different types of chips can visually be easily and quickly identified, the chips are still visually inspected. See, for example, U.S. Pat. No. 3,350,802 (Segel) issued Nov. 7, 1967, U.S. Pat. No. 3,953,932 (Graves) issued May 4, 1976, U.S. Pat. No. 3,968,582 (Jones) issued Jul. 13, 1976, U.S. Pat. No. 4,435,911 (Jones) issued Mar. 13, 1984, and U.S. Design Patent Nos. 232,367, 237,724 and 240,053 (all of Garaventa) issued Aug. 13, 1974, Nov. 18, 1975 and May 25, 1976, respectively. It is known to provide chips with means so that the presence of the chips can automatically be detected. See for example, the 582 Patent (Jones) and U.S. Pat. No. 3,766,452 (Burpee et al.) issued Oct. 16, 1973.

It is also known to provide tokens with codes which can automatically be read from the faces of tokens. See, for example, U.S. Pat. No. 2,410,845 (Snell et al.) issued Nov. 12, 1946, U.S. Pat. No. 2,983,354 (Ember et al.) issued May 9, 1961, U.S. Pat. No. 3,171,020 (Lord) issued Feb. 23, 1975, U.S. Pat. No. 3,926,291 (Burke et al.) issued Dec. 16, 1975 and U.S. Pat. No. 4,371,071 (Abedor et al.) issued Feb. 1, 1983. As to other objects, it is known to apply codes to the surfaces of containers and packages, for example, for identification, price or inventory purposes. See, for example, U.S. Pat. No. 3,643,068 (Mohan et al.) issued Feb. 15, 1972 and U.S. Pat. No. 4,449,042 (Hampson et al.) issued May 15, 1984.

There remains a need, however, for apparatus and methods for automatically obtaining information from objects, particularly disc-like objects such as gambling chips, and particularly in real time. With respect to gambling chips, there is a need to obtain more information relating to the chips and to casino management operations involving them, and to process such information in real time without interrupting or interfering with normal gambling activities. Similar needs exist for obtaining information from many other objects and processing same.

OBJECTS AND SUMMARY OF THE INVENTION

It is an object of the present invention to improve and/or facilitate information transfer and/or use.

It is another object of the present invention to improve and/or facilitate information transfer and/or use associated with objects and/or signals by means of novel coding, decoding and/or information transfer systems.

It is another object of the present invention to improve and/or facilitate information transfer and/or use by means of coding, decoding and/or information transfer systems in connection with product and/or object identification and/or pricing, for example, as a universal product code (UPC), and/or for identifying or tracing and/or denominating commercial paper and currency, and/or for identifying and/or denominating gambling chips, coins and tokens, etc.

It is another object of the present invention to provide such systems for coding/decoding, information transfer and/or use which do not require a reference element or character or other means of identifying a specific reference point or position in the code such as the start of the code in order to read or decode or use the coded information.

It is another object of the present invention to improve and/or facilitate the transfer and/or use of binary information by providing novel codes representing binary information.

It is another object of the present invention to provide objects, particularly disc-like objects such as gambling chips, coins, tokens, etc., having machine-readable information encoded about the periphery thereof according to a code which does not require a code element or character or other means identifying a specific reference point or position in the code such as the start of the code.

It is another object of the present invention to automate information gathering, transfer and/or processing related to objects, particularly gambling chips in a gambling establishment.

It is another object of the present invention to automatically obtain information related to objects, particularly gambling chips in a gambling establishment, particularly in real time, without interrupting or interfering with gambling activities.

It is another object of the present invention to automatically count and/or identify objects, particularly gambling chips, in a gambling establishment in real time without interrupting or interfering with gambling activities.

It is another object of the present invention to identify the status of objects, particularly gambling chips, in a gambling establishment in real time without interfering with gambling activities.

It is another object of the present invention to provide objects, particularly disc-like objects such as gambling chips, coins, tokens, etc., having machine-readable coded information, and to provide methods and apparatus for automatically reading the coded information from the periphery of the objects and thereby obtaining information, particularly in real time, useful in managing the objects and activities related to or using the objects.

It is another object of the present invention to provide objects, particularly disc-like objects such as gambling chips, coins, tokens, etc., having coded information machine-readable from the periphery thereof according to a code which does not require a specific orientation of the code and reading apparatus with respect either to reading the code or identifying a code element or character, or specific reference point or position of the code such as the start of the code.

It is another object of the present invention to provide systems including objects having machine-readable information for obtaining the information from the objects.

It is another object of the present invention to provide methods, apparatus and systems for reading machine readable coded information on objects, particularly disc-like objects such as gambling chips, coins, tokens, etc., and for decoding the coded information read from such objects, particularly in real time.

It is another object of the present invention to maintain gambling chips aligned in columns in a chip rack.

It is another object of the present invention to provide means to automatically determine the number of chips present in each column of a chip rack.

It is still another object of the present invention to obtain information relating to gambling chips and other objects, as described in the foregoing objects of the invention, in real time.

The invention provides apparatus and methods for coding, decoding, obtaining, transferring and/or using information in a code associated with an object and/or signal in which a specific reference point or reference to a specific time or position in the code is not defined. The invention also provides systems, apparatus and methods for generating and applying machine-readable information to objects such as gambling chips, to encoding signals with information, to transferring and using information in connection with objects and signals, and for obtaining information from objects and signals.

The terms "machine-readable information", "machine-readable forms", etc., are used in a broad sense and are meant to encompass forms of information which may automatically be obtained from objects by appropriate apparatus and methods; similarly, "machine read", "machine readable", etc., are used in a broad sense and are meant to encompass techniques, methods and apparatus for automatically obtaining from objects information applied thereto or associated therewith.

One aspect of the invention involves generating information according to a code which involves a plurality of code elements (e.g., digits, characters, positions, places, pulses, signals, etc.) and which preferably do not define a specific reference, e.g., the code does not include a code element, character or information identifying a specific reference point or position in the code or a reference to a specific orientation or a reference to a specific time, and applying such coded information to objects or encoding a signal with the coded information. A code element or character, or information identifying a specific reference point, position, place, character, element, orientation, time, etc., and other reference information is referred to herein simply as a "reference" or as a "specific reference". According to this aspect, shifted sets of coded information are provided by processing unique sets of information. Methods and apparatus are disclosed for decoding such information. The information may be applied to objects according to a code with or without a specific reference, and the information may be unique identifying information for each object or for all objects contained within a particular group or class (e.g., chips of the same denomination).

According to one aspect of the invention, a plurality of objects is provided, each object having machine-readable information associated therewith coded according to a code comprising a predetermined number of code elements. The code elements are of generally equal size and extend along a line or in a substantially closed loop, and the code elements are generally uniformly arranged along the line or in the loop. Preferably, none of the code elements in the line or loop define a specific reference for the code and the object is provided with a number of code elements which is greater than a complete code, i.e., a first complete code and at least one other code or part thereof. A complete code may be read from the object by reading a set of consecutive code elements equal to or greater than the predetermined number of code elements, the set of consecutive code elements being located anywhere along the line or in the loop. Alternatively, the consecutive set may be defined by one code element at the beginning of the line, or two code elements, one at the beginning and one at the end of the line.

According to another aspect of the invention, a plurality of objects is provided, each being encoded with a set of coded machine readable binary information which is associated with a predetermined area thereof. The set of coded information is encoded once in the predetermined area which area may be larger than the area occupied by the coded information. The coded information has a plurality of code elements extending along a line, all of the code elements being the same size and being uniformly arranged and spaced along the line. Each code element is defined by one of two machine readable contrasting properties, e.g., black and white. Each two adjacent code elements share a common boundary, there being no space between adjacent elements. The predetermined area defines a first (e.g., white) of the two contrasting properties of the code elements, and a second (i.e., black) contrasting property is imparted in or on the predetermined area to create the coded binary information. One end element of each of the sets of coded information (the same end element of each set) is of the second (i.e. black) contrasting property. Each code element has a lateral extent extending along the line which is not greater than $1/N$ of the total length of a set of coded information, where $N$ is the number of code elements in a set of coded information.

Coding one or both end code elements with the second contrasting property, i.e., a property contrasting with that of the background area, enables the coded information disposed on the background of the first contrasting property to be quickly located and the length of a set of coded information determined.

As mentioned above, the invention is particularly described with respect to gambling chips, but it is to be understood, however, that the invention and its use are not limited to gambling chips. When such information is applied to gambling chips for use in a gambling establishment, it provides the capabilities of chip counting, and/or uniquely identifying each chip and/or its status, and/or uniquely identifying groups or classes of chips, for example, by denomination. These capabilities may be achieved in real time, on a continuous or periodic basis and without interrupting or interfering with gambling activities.

Still another aspect involves the automatic reading and decoding of information from the objects while ensuring that all of the necessary coded information is read from objects and taking resolution, boundary and threshold conditions into consideration. With respect to stacked objects such as gambling chips, a problem in automatically reading coded information from the chips is to present all of the coded information on an object, i.e., a complete set of coded information, to the reading apparatus while the objects are stacked, and in the case of chips, without interrupting or interfering with gambling activities, and preferably without changing the manner in which the chips are used at gambling tables by both players and game operators. Racks currently in use for holding gambling chips arrange the chips in a stack or a column, typically extending horizontally, with a substantial portion of the periphery of the chips exposed so that the chips can be visually observed and handled without difficulty. Hence, only the chip peripheries are exposed or otherwise accessible for reading coded information since the faces of adjacent chips are typically not separated from each other and, therefore, are not accessible for reading coded information. Although the region of the racks adjacent the exposed part of the peripheries of the chips are available for positioning reading apparatus to read coded information on the exposed chip peripheries, the presence of such reading apparatus may change the appearance of the racks, obscure the chip peripheries and/or interfere with handling of the chips. Thus, it was concluded that coded information should be obtained from only a part of a chip periphery and preferably the part which faces inwardly of the rack and is not exposed. It was further concluded that a chip periphery should be encoded with code elements defining more than one complete set of coded information to ensure that at least one set of code elements defining the complete set of coded information will always be positioned adjacent appropriately deployed reading apparatus regardless of the orientation of the chip in the rack.

It was realized, however, that because a round chip could be placed in the rack in virtually an infinite number of orientations of the chip periphery relative to the rack, a chip periphery would seldom be aligned with the reading apparatus so that the first code element of the code is read first. In other words, in almost all cases, the reading apparatus would commence reading the chip periphery at a point other than the start of the code. It was concluded therefore, that the decoding or information obtaining system for round chips at least, should be capable of automatically reading coded information from a chip periphery without first orienting the chip periphery in the rack in any predetermined way.

One solution to the orientation problem described above is to encode information identifying a reference such as the location of the start of the code on the chip. While the coded information could be automatically read from the chip periphery without orienting the chip in the rack, and the coded information including the reference processed to decode the coded information, this solution may not be entirely practical regardless of the specific type of coding used because: encoding a mechanical reference point entails a visible alteration of the chip s appearance; providing a non-mechanical machine-readable code element as a reference increases the number of code elements required presenting resolution problems; and using a code having, in addition to information states (e.g., binary) an additional distinct coded state to identify the reference, required the use of analog reading apparatus or a ternary or higher order code.

Another problem involves the requirement to read the same information from an encoded chip regardless of the orientation of the chip faces relative to the rack, noting that a chip can be placed in a rack in either of two orientations of its faces relative to the rack, i.e., right side up or upside down. Possible solutions to this problem entail providing information on the chip to indicate a direction of reading, or encoding/decoding for two-way reading of the same coded information, or providing multiple sets of coded information, one of which is selectively read in a predetermined direction regardless of the orientation of the chip in the rack.

Another possible problem is the resolution with which a reading apparatus can read coded information from a chip. The information to be encoded may be applied to the chips in any number of ways, for example, optically, magnetically, mechanically, sonically, electrically (e.g. capacitively, inductively, resistively, open circuit, short circuit or combinations thereof), etc. Information corresponding to each code element is physically encoded on a respective given part, or "codable position", of a chip. In varying degrees and substantially independently of what physical form code elements take, the larger the codable position, the more reliably the code element encoded thereon can be read. The size of code elements on gambling chips takes on particular significance when it is noted that approximately one million chips are required for use at any one time by Las Vegas type casinos, and that a binary code sufficient to uniquely identify one million chips requires approximately twenty code elements or binary digits and a corresponding number of codable positions on the chip, without considering upside down chips, non-unique or otherwise invalid information ("invalid codes") and code elements and corresponding codable positions which may be used to define a reference ("reference codable elements" and "reference codable positions"). In practice, however, additional code elements are required because unique sets of coded information ("valid codes") must be reserved for future use by a casino and also because only part of the total number of available unique sets of coded information may be used at any one time to help deter counterfeiting since unused unique sets will be considered invalid (unauthorized) codes. For example, a binary code with approximately twenty-four code elements and corresponding codable positions, without considering invalid codes and reference codable elements and positions or upside down chips, yields approximately 16 million unique binary numbers, so that 16 million chips can be uniquely encoded, a number considered adequate for future use by present day casinos.

According to the invention, a system and method are provided for automatically obtaining information from generally disc-like objects such as gambling chips. Coded information is applied to the disc-like objects so as to be machine readable from the periphery thereof, and a plurality of such objects is provided. Each of the plurality of objects has a plurality of code elements which are machine readable from the periphery thereof, and each of the plurality of objects preferably has the same number of code elements which respectively define information carried by the respective objects. The code elements are machine read from the periphery of the objects and processed to obtain said information. Preferably, the code elements do not define a specific reference for the code.

According to one embodiment, the code elements have an axial extent extending axially for a substantial distance and a peripheral or lateral extent extending peripherally. The peripheral extents of the code elements are substantially the same and not greater than about 1/N of the perimeter of the respective object, where N is the predetermined number of code elements. The code thus extends peripherally along the periphery of the disc-like object. Preferably, the code elements are juxtaposed and uniformly arranged extending in a closed loop or substantially closed loop. According to another embodiment, the code elements have a peripheral extent extending peripherally for a substantial distance and an axial extent extending axially, the axial extents of the code elements being substantially the same and not greater than about 1/N of the axial extent or thickness of the respective object. preferably, the code elements are juxtaposed and uniformly arranged extending axially of the object. The code thus extends axially of the disc-like object and extends along a line. Preferably, each code element extends substantially completely about the periphery of the object.

In preferred embodiments, the code elements define binary information and do not define a specific reference for the code. Since there is no defined reference, in accordance with the invention, all unique permutations and combinations of binary digits do not represent unique identifying information, i.e., some unique permutations and combinations represent identical identifying information in the inventive coding system described herein. Among the unique permutations and combinations of binary digits which do not define unique identifying information, one is selected to represent a unique set of coded information and the others are considered invalid, and those invalid permutations and combinations of binary digits ("invalid codes") are not encoded on any objects.

In order to derive meaningful information from binary information encoded on an object, binary information constituting a complete set of coded information is read from the object and processed, i.e. decoded, to yield unique identifying information for the binary information encoded on the object. Decoding binary information from a code without a reference, in accordance with the invention, involves shifting the binary information to position binary levels in a predetermined manner. As indicated above, only binary information representing unique identifying sets of coded information (valid codes) has been encoded on the objects so that all decoded information represents unique information or valid codes, otherwise the object is damaged or unauthorized.

As discussed above, since a chip (disc-like object) is placed in a chip rack without any specific relative orientation of the chip periphery to the rack, and since only a part of the chip periphery is presented to reading apparatus, the code elements must be sized and sets of code elements must be disposed so that a complete set of code elements will be presented to the reading apparatus regardless of the relative orientation of the chip periphery to the rack. For a peripherally readable code, three sets of code elements extending peripherally in a closed loop about the full periphery of the chip are considered sufficient to ensure that a complete set of coded information is presented to the reading apparatus and at the same time optimizing the peripheral extent or width of the individual code elements. Thus, 72 code elements and corresponding codable positions are preferred, not considering invalid codes and code elements for a reference. As described below, 90 codable positions are preferred for a casino gambling chip having a peripherally-readable code without any specific reference and taking invalid codes into consideration.

Code elements can be encoded: magnetically and read by Hall effect transducers; optically and read with light responsive elements which may utilize fiber optics; mechanically (e.g. flats) and read by microswitches; electrically (e.g. capacitance) and read by electrical scanning techniques which are responsive to differences in capacitance, etc. With respect to optically-readable coded information, optical energy could be provided to illuminate each code element separately or a number of code elements may be simultaneously illuminated by one or a plurality of illuminating devices or by ambient light, etc. The optical energy could be laser light, visible light, infrared light, ultraviolet light, etc. The above and other reading means may include discrete reading elements or a matrix of reading elements.

For round chips or objects, which may be placed in a chip rack without first orienting the chip periphery relative to the rack, it is possible that discrete portions of the reading means are disposed precisely or approximately at the boundary of adjacent code elements. According to the invention, one way to solve this potential problem is by providing the reading means with a plurality of discrete reading elements and processing means to determine whether the discrete reading elements are disposed adjacent one codable position or the adjacent codable position. Other electronic solutions are also presented.

Alternatively, a mechanical configuration (e.g., a regular polygon) of the chip or object and corresponding structure in the rack may be provided to hold the chip in the rack in a limited number of orientations of the chip periphery relative to the rack, and the code elements and the reading means appropriately chosen and positioned.

A system according to the invention comprises means for reading binary information (i.e., two levels) from the chips or objects, and processing means for processing the binary information read from the chips and providing therefrom information with which the chip was encoded. In a specific embodiment of the system, memory means are provided associated with one or more racks disposed at a common location for storing either the binary information read from the chip or binary information corresponding thereto which is provided by a processing means also disposed at the common location. The system may further include a central computer and means coupling the central computer and each of the locations (remote from the central computer) so that information can be transmitted between the central computer and the remote locations, preferably in both directions. In a specific embodiment, processing means are provided at the remote locations for decoding the binary information read from the chips and for providing the decoded binary information to the memory means. Information such as chip denomination and/or location at which the chip was read may be associated with the chips and made available by the central computer to management personnel.

Another potential problem is that a chip or disc-like object could be placed in a rack out of radial alignment, i.e., askew. It was therefore concluded that it may be desirable to include some means for radially aligning the chips in the rack. One specific embodiment of such means comprises a resiliently biased structure which urges a chip or chips in a chip column to one end of the column.

Although chips or objects may be counted by reading coded information from the chips as described above, it is also possible to count chips simply by detecting their presence. In accordance with this aspect of the invention, means are provided wherein the presence of chips in chip racks is detected automatically in real time at the gambling tables without interrupting or interfering with gambling activities. From such detection, the chips may be counted. According to one embodiment such means provides a signal related to the length of a stack of chips, from which the number of chips in the stack may be determined. According to another embodiment, such means includes discrete locations in the chip rack for holding chips and means associated with such discrete location for detecting the presence or absence of a chip, whereby the chips may be counted.

A system according to the invention of the type described above can be used for carrying out one or more of the following casino functions without shutting down the casino and without interrupting or interfering with any game whose chips are being read or their presence detected: (1) detect damaged and counterfeit chips; (2) count chips at a location by total with or without denomination totals, at any instant of time and thereby provide chip counts and/or revenue information; (3) compute changes in the total chips present in specific racks and/or locations; (4) provide a history of the activity of any chip or the chips of any denomination over a given time period; (5) monitor chip activity at any game over a given time to monitor either the game itself or the game operator, etc. By providing player's racks at gaming tables, additional information can be obtained with respect to the activity of a particular player. In carrying out the functions described above, the system, in addition to providing cash and chip monitoring and management information, can provide statistical information never before available that would suggest a variety of new and more profitable methods of operation.

A system, according to the invention, identifies items of currency and the like, including detecting the use of counterfeits and the ability to trace items of currency. Each item is encoded with unique machine-readable binary information. This system comprises means for storing identifying information which is associated with the information, means for reading the encoded information from the items at more than one location, means coupled to receive the read information, and means for comparing stored identifying information with the received information to detect if two or more items are encoded with the same information thereby detecting counterfeits, and/or to identify any item which is encoded with unauthorized information thereby detecting counterfeits and/or identify any items that are being traced. The above and other objects, aspects, features, advantages and uses of the invention will be more readily perceived from the description of the preferred embodiments thereof taken with the accompanying drawings and appended claims.

BRIEF DESCRIPTION OF THE DRAWINGS

The invention is illustrated by way of example and not limitation in the figures of the accompanying drawings in which like references indicate like parts, and in which.

DESCRIPTION OF THE PREFERRED EMBODIMENTS

Figure 1:
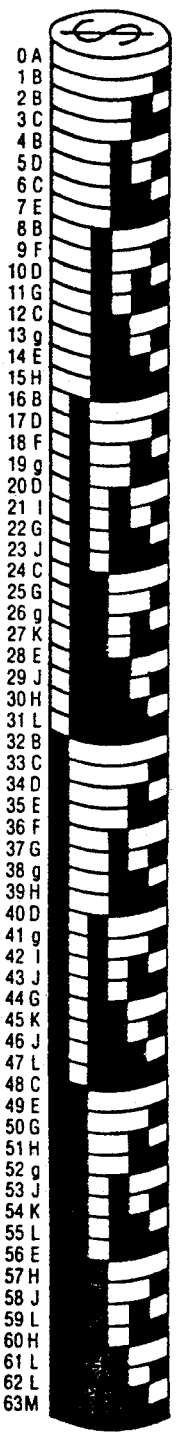
FIG. 1 is a schematic representation of a set of gambling chips arranged in a single pile illustrating all possible unique binary numbers which can be had with six code elements on the chips when a reference or starting point is used.

Although the invention is described below primarily in connection with casino gambling chips, it is to be understood that the invention has many other applications.

Coded Information Without A Reference

Generating binary numbers, for example, which may be read without the aid of a reference may involve processing normal binary numbers to obtain shifted binary numbers. All unique binary numbers which could be encoded on a chip with a starting point or other reference point do not result in unique binary information (valid codes) when no reference is used. To illustrate this point and to demonstrate one way of selecting valid codes when no reference is used, binary codes having six code elements (codable positions) will be used. With six code elements, 64 ($2^6$) possible unique binary numbers (0 to 63 inclusive) representing unique binary information can be formed when a normal reference is used. When decoding these 64 unique binary numbers in accordance with the invention, however, only 13 of the 64 will be found to have unique or valid codes when no reference is used. Table I below illustrates the (valid) codable numbers which a binary number with six codable positions yields.

TABLE I

| Decimal No. | Binary No. | Valid No. | Decoded No. |
| --- | --- | --- | --- |
| 0 | 000000 | A* | 000000 (A*) |
| 1 | 000001 | B* | 000001 (B*) |
| 2 | 000010 |  | 000001 (B) |
| 3 | 000011 | C* | 000011 (C*) |
| 4 | 000100 |  | 000001 (B) |
| 5 | 000101 | D* | 000101 (D*) |
| 6 | 000110 |  | 000011 (C) |

TABLE I-continued

| Decimal No. | Binary No. | Valid No. | Decoded No. |
| --- | --- | --- | --- |
| 7 | 000111 | E* | 000111 (E*) |
| 8 | 001000 | | 000001 (B) |
| 9 | 001001 | F* | 001001 (F*) |
| 10 | 001010 | | 000101 (D) |
| 11 | 001011 | G* | 001011 (G*) |
| 12 | 001100 | | 000011 (C) |
| 13 | 001101 | | 001011 (g) |
| 14 | 001110 | | 000111 (E) |
| 15 | 001111 | H* | 001111 (H*) |
| 16 | 010000 | | 000001 (B) |
| 17 | 010001 | | 000001 (D) |
| 18 | 010010 | | 000101 (F) |
| 19 | 010011 | | 001011 (g) |
| 20 | 010100 | | 000101 (D) |
| 21 | 010101 | I* | 010101 (I*) |
| 22 | 010110 | | 001011 (G) |
| 23 | 010111 | J* | 010111 (J*) |
| 24 | 011000 | | 000011 (C) |
| 25 | 011001 | | 001011 (G) |
| 26 | 011010 | | 001011 (g) |
| 27 | 011011 | K* | 011011 (K*) |
| 28 | 011100 | | 000111 (E) |
| 29 | 011101 | | 010111 (J) |
| 30 | 011110 | | 001111 (H) |
| 31 | 011111 | L* | 011111 (L*) |
| 32 | 100000 | | 000001 (B) |
| 33 | 100001 | | 000011 (C) |
| 34 | 100010 | | 000101 (D) |
| 35 | 100011 | | 000111 (E) |
| 36 | 100100 | | 001001 (F) |
| 37 | 100101 | | 001011 (G) |
| 38 | 100110 | | 001010 (g) |
| 39 | 100111 | | 001111 (H) |
| 40 | 101000 | | 000101 (D) |
| 41 | 101001 | | 001011 (g) |
| 42 | 101010 | | 010101 (I) |
| 43 | 101011 | | 010111 (J) |
| 44 | 101100 | | 001011 (G) |
| 45 | 101101 | | 011011 (K) |
| 46 | 101110 | | 010111 (J) |
| 47 | 101111 | | 011111 (L) |
| 48 | 110000 | | 000011 (C) |
| 49 | 110001 | | 000111 (E) |
| 50 | 110010 | | 001011 (G) |
| 51 | 110011 | | 001111 (H) |
| 52 | 110100 | | 001011 (g) |
| 53 | 110101 | | 010111 (J) |
| 54 | 110110 | | 011011 (K) |
| 55 | 110111 | | 011111 (L) |
| 56 | 111000 | | 000111 (E) |
| 57 | 111001 | | 001111 (H) |
| 58 | 111010 | | 010111 (J) |
| 59 | 111011 | | 011111 (L) |
| 60 | 111100 | | 001111 (H) |
| 61 | 111101 | | 011111 (L) |
| 62 | 111110 | | 011111 (L) |
| 63 | 111111 | M* | 111111 (M*) |

Binary numbers having six codable positions yield a total of 64 unique binary numbers which are listed in the column headed "Binary No." Each unique binary number is identified at its left by its equivalent decimal number in the column headed "Decimal No." Each of the 64 unique binary numbers can be decoded to provide the corresponding decoded number listed in the column headed "Decoded No." In decoding, the six codable positions are joined end to end, i.e. in a circle, and read either clockwise or counterclockwise starting with the largest number of consecutive logical zeros. For example, the binary number "000001" and the binary number "000010," when read in this fashion, yield the same decoded number "000001." When decoded in this fashion, the 64 unique binary numbers will yield only 13 unique decoded numbers designated "A" through "M" in the column headed "Decoded No.". One decoded number out of each group of decoded numbers is designated a valid number and is identified by an asterisk in the columns headed "Valid No." and "Decoded No." In Table I, the lowest binary number in each lettered group, A to M, has been designated as the valid number for that group in the column headed "Valid No."

Figure 2:
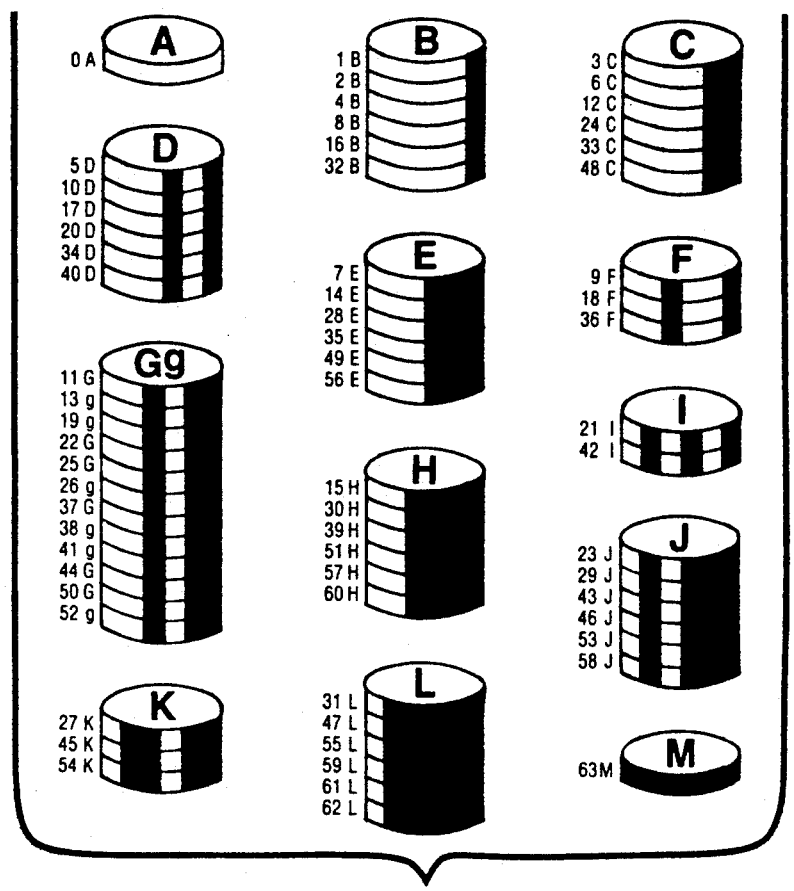
FIG. 2 is a schematic representation of the same gambling chips of FIG. 1, arranged in sub-piles of binary numbers representing the same coded information when the starting points of the binary numbers are disregarded and the chips are rotated or flipped and rotated.
Figure 3:
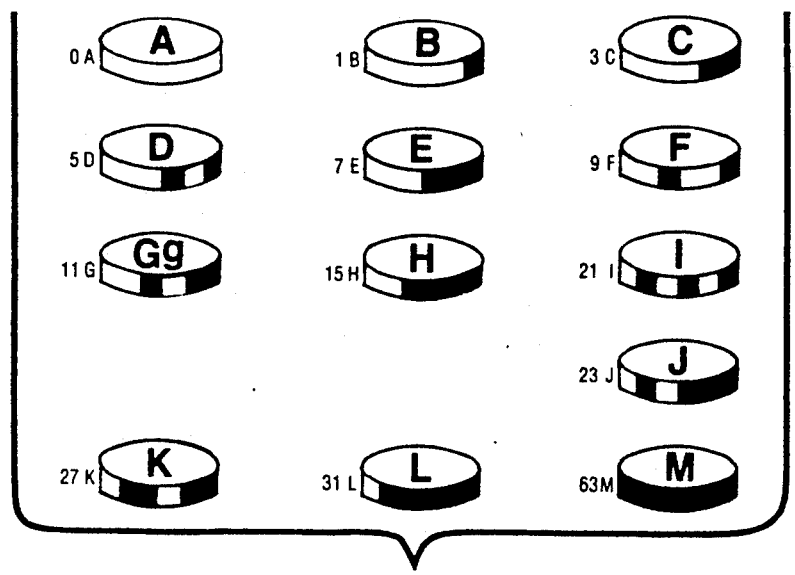
FIG. 3 is a schematic representation of one gambling chip from each of the sub-piles of FIG. 2 which is selected as having unique coded information, i.e., a valid code.

FIGS. 1-3 illustrate the coding/decoding system of the invention with a six code element or codable position code applied to gambling chips. The binary levels are represented by light and dark stripes (e.g. an optical code) along the peripheral edge of the chips, a light stripe denoting a logical zero level and a dark stripe denoting a logical one level.

FIG. 1 shows 64 gambling chips numbered 0 to 63, stacked in a pile with the chips having binary patterns, sequentially and consecutively generated corresponding respectively to the binary numbers shown in Table I and identified by a decimal number and a letter indicating in which group or sub-pile each binary number falls. FIG. 2 shows the same 64 chips of FIG. 1 sorted into 13 sub-piles of chips corresponding respectively to the 13 groups into which the 64 binary numbers can be arranged when decoded as described above, each sub-pile being identified by the letter of the binary numbers in the sub-pile or group as set forth in Table I. In the sub-pile identified by Gg, G represents reading the code in one direction, i.e., the chip being right side up, and g represents reading the code in the opposite direction or reverse order, i.e., the chip being upside down or flipped. FIG. 3 shows the 13 chips having valid numbers which the six codable positions yield, as indicated by the asterisked letters.

Thus, to decode the binary numbers, they may be arranged in groups or sets, and to obtain valid numbers, a limiting number, e.g., the lowest possible number (i.e., the lowest number that a particular pattern of binary logical levels can represent) of each set is selected. (The highest possible number that a set can represent can be selected instead as the limiting number and other variations are also possible.) Arranging the binary numbers into sets can be achieved by shifting (rotating) the codable positions until the lowest possible binary number is obtained (flipping the chip if necessary), as in the last column of Table I. The first (lowest) unique decoded number for each set can then be designated as a valid number.

One technique for accomplishing decoding of any pattern of binary digits to the lowest number that that pattern can represent is to ascertain the largest consecutive grouping of binary zeros, and position them by shifting to the left. If this number of binary zeros is found in more than one place in the pattern, then further arranging is required as described below. Consideration of the reverse order or upside down pattern would also have to be accomplished.

A novel convenient coded notation created by the applicants for representing a binary number is illustrated by Table II below.

TABLE II

| Conventional Decimal No. | Conventional Binary No. Equivalent | Binary Notation Equivalent | Decoded (Shifted) Notation |
| --- | --- | --- | --- |
| 4321 | 1000011100001 | +1−4+3−4+1 | −4+2−4+3 |

Table II employs an arbitrarily chosen decimal number 4321, whose binary equivalent is "1000011100001", as an example. That number is decoded to "0000110000111", or "110000111". According to this notation, each logical one is represented by "+1" and each logical zero by "−1", and consecutive logical ones are added and consecutive logical zeros are added, and if the sign of the first and last term are the same, they are added.

In working with this notation to decode a binary number in the coding/decoding system of the invention, shifting is carried out to arrange the highest negative number at the left. If there are two or more highest negative numbers, then the highest negative number followed by the lowest positive number is arranged at the left, etc. Thus, the binary number of this example, "10001110001" is represented by the notation "+1 −4 +3 −4 +1", which when the first and last terms are combined, since they are both positive, gives −4 +3 −4 +2 or +2 −4 3 −4, and when shifted, provide the decoded notation "−4 +2 −4 3". Since this binary number is symmetrical, the notation is the same regardless of whether the code is read from left to right or from right to left. The above example assumes that 13 codable places are used. If more codable places are used, allowance for leading zeros would have to be made. (Leading zeros would be represented by another minus value, as is made clear in the above description.)

The following shows the coding/decoding system and the coded binary notation working together and can be related to Tables I and II and FIGS. 1, 2 and 3. The binary information "000011000011000011" represents three repetitions of the six place binary number "000011". Selecting any possible consecutive combination of six codable positions, without regard to any reference, yields the following possible binary numbers: "000011" (decimal 3), "000110" (decimal 6), "001100" (decimal 12), "011000" (decimal 24), "110000" (decimal 48) and "100001" (decimal 33). When any one of these binary numbers is decoded with the novel notation as described above, it will yield the notation "−4, +2", i.e., the decoded valid and unique binary number "000011". Thus, the decoded binary number "000011" (decimal 3) can be obtained from binary coded information without a starting point or other reference. As described above and demonstrated in Table I, the decoded binary number "000011" is limiting and is designated valid, i.e., the lowest possible representation of all of the numbers which it could represent, and that decimal number equivalent 3, is considered valid while all others are considered invalid.

The coding/decoding system may therefore operate to uniquely identify chips encoded with binary information without an encoded starting point or other reference.

It should be pointed out that the security of the coding/decoding system described herein does not reside in secrecy of the manner of coding and decoding, but rather security resides partially in the use of substantially less than all possible valid numbers available and in the random secret selection thereof. Thus, if a casino utilizes a code capable of encoding about 18 million chips and selects randomly only one million valid numbers to be encoded on one million chips, (designating the unauthorized 17 million as potential counterfeits) one would not be able to deduce from a sampling of the chips in use what valid numbers are being used. Security, moreover, resides in the fact that two or more chips with the same coded information means that one or more of them is counterfeit.

Each of the numbers obtained from a decoded binary number can be represented by an algebraic expression.

For example, any number from the sub-pile "B" (FIG. 2) can be represented by the expression $2^x$, where x is any number between zero and the number of codable positions in the code minus one. Similarly, any number from the sub-pile "C" can be represented by the algebraic expression $2^x+2^{x+1}$. Table III below shows the correspondence of valid decoded numbers to algebraic expressions.

TABLE III

| Valid No. | Decoded No. | Algebraic Expression | Decimal No. (x = 0) |
|---|---|---|---|
| A | 000000 | 0 | 0 |
| B | 000001 | $2^x$ | 1 |
| C | 000011 | $2^x+2^{x+1}$ | 3 |
| D | 000101 | $2^x+2^{x+2}$ | 5 |
| E | 000111 | $2^x+2^{x+1}+2^{x+2}$ | 7 |
| F | 001001 | $2^x+2^{x+3}$ | 9 |
| G | 001011 | $2^x+2^{x+1}2^{x+3}$ | 11 |
| H | 001111 | $2^x+2^{x+1}+2^{x+2}+2^{x+2}$ | 15 |
| I | 010101 | $2^x+2^{x+2}+2^{x+4}$ | 21 |
| J | 010111 | $2^x+2^{x+1}+2^{x+2}+2^{x+4}$ | 23 |
| K | 011011 | $2^x+2^{x+1}+2^{x+3}+2^{x+4}$ | 27 |
| L | 011111 | $2^x+2^{x+1}+2^{x+2}+2^{x+3}+2^{x+4}$ | 31 |
| M | 111111 | $2^x+2^{x+1}+2^{x+2}+2^{x+3}+2^{x+4}+2^{x+5}$ | |

Each algebraic expression in Table III represents the valid number from each sub-pile of chips in FIG. 2 if we assign the value zero to x. Assigning values to x of 1 through 5 for each algebraic expression in Table III produces the non-valid values for the other chips in each sub-pile. Also, any six place binary number represented by this type of algebraic expression thus defines the chip sub-pile that that number resides in according to the inventive coding scheme, and x can be varied from 0 through 5 to see which variation produces the lowest result which is the valid number from that sub-pile.

Therefore, algebraic expressions of the type in Table III can be used for decoding. In a six code element (six codable positions or places) system, however, the exponents of 2 cannot be greater than 5 or less than 0 because, in effect, the exponent defines a particular code element or codable place, and digits 0 to 5 are the only codable places in a six place system. Thus, adding, e.g., 2 to an x of 5, yields the result 1. This is because the "first" codable place and the "last" codable place are related as any other two adjacent codable places are related in the system. Mathematically, this is represented by 2+5=7, and reducing 7 mudulo six yields the residue 1. Also, subtracting each power from 5 (complementing 5) gives the reverse order reading. By systematically varying the exponents in accordance with predetermined parameters, algebraic expressions can also be used to determine what the valid numbers are, and how many there are, for a given number of codable places.

Generating Coded Information Without A Reference

For a given number of code elements or codable positions a sequential listing of all valid numbers can be generated for use or storage according to a method referred to herein as "counting", i.e., augmenting from the lowest valid number 0 (or a given valid number) to the next highest. Since all binary numbers ending in 0 (even numbers) are not valid numbers because they are not limiting, i.e., not the lowest possible representation of a number when decoded, only odd numbers are valid and two consecutive numbers cannot both be valid numbers. The only exception for consecutive valid numbers are 0 and 1, and the only exception for an even valid number is 0, which is unique in all relevant respects. Also, all valid numbers begin and end with 1, except for the valid number 0.

Figure 4:
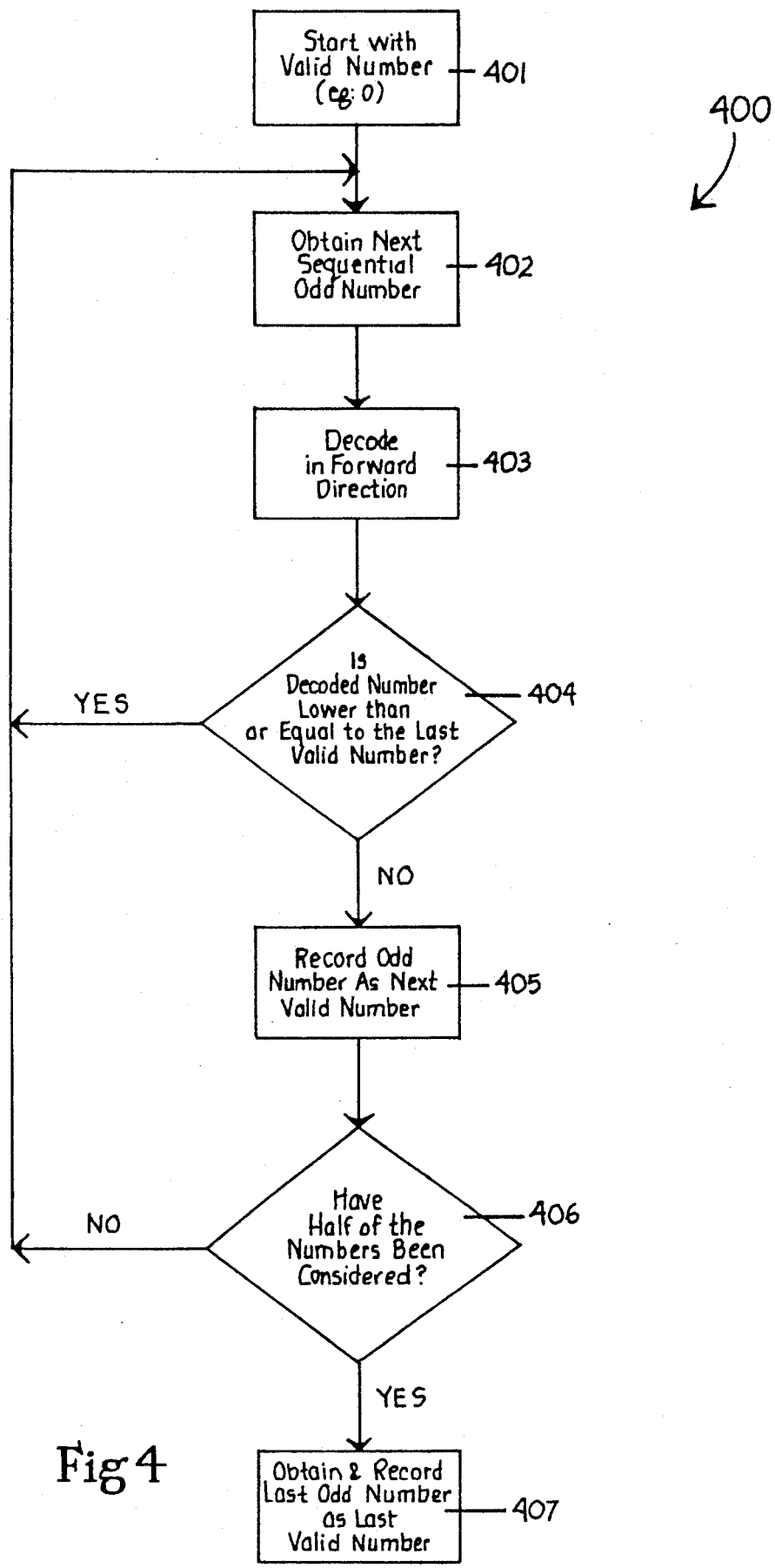
FIG. 4 is a flow chart illustrating a method for generating valid binary coded numbers for a given number of code elements, each valid binary coded generated number representing unique coded information when read and decoded in one direction only in the coding/decoding system of the invention.

This method of counting valid numbers (read in one direction only) is illustrated by the flow chart 400 depicted in FIG. 4 and can be used with any given number of codable positions. Counting starts in step 401 with a valid number, for example, 0. In step 402, the next sequential odd number is obtained and in step 403 that next sequential odd number is decoded to a limiting, i.e., the lowest possible, representation. In step 404, the decoded number is compared to the last decoded valid number, and if it is higher than that valid number, that number is the next valid number and is recorded in step 405. If it is not, that odd number is discarded and the method reverts to step 402 where the next sequential odd number is obtained. The set of binary numbers being evaluated (0 to $2^N-1$, where N the number of codable positions) to obtain valid numbers can be divided into two halves. All but one valid number are contained in the first half, and the only valid number in the second half is the last (odd) binary number ($2^N-1$). The last odd binary number of a series is composed of N binary 1's and it is the only valid binary number in the second half because all other numbers in the second half have at least one binary 0, which when shifted to position the 0 on the left during decoding, results in a number which was previously considered. Therefore, after each valid number is recorded in step 405, step 406 determines whether half of the possible numbers have been considered. If they have not, the system reverts to step 402 for consideration of the next sequential odd number. If half of the numbers have been considered, then the method in step 407 obtains and records the last odd number as the last valid number and stops, having determined and recorded valid numbers (read in one direction only) in sequence for a given number of places.

Figure 5:
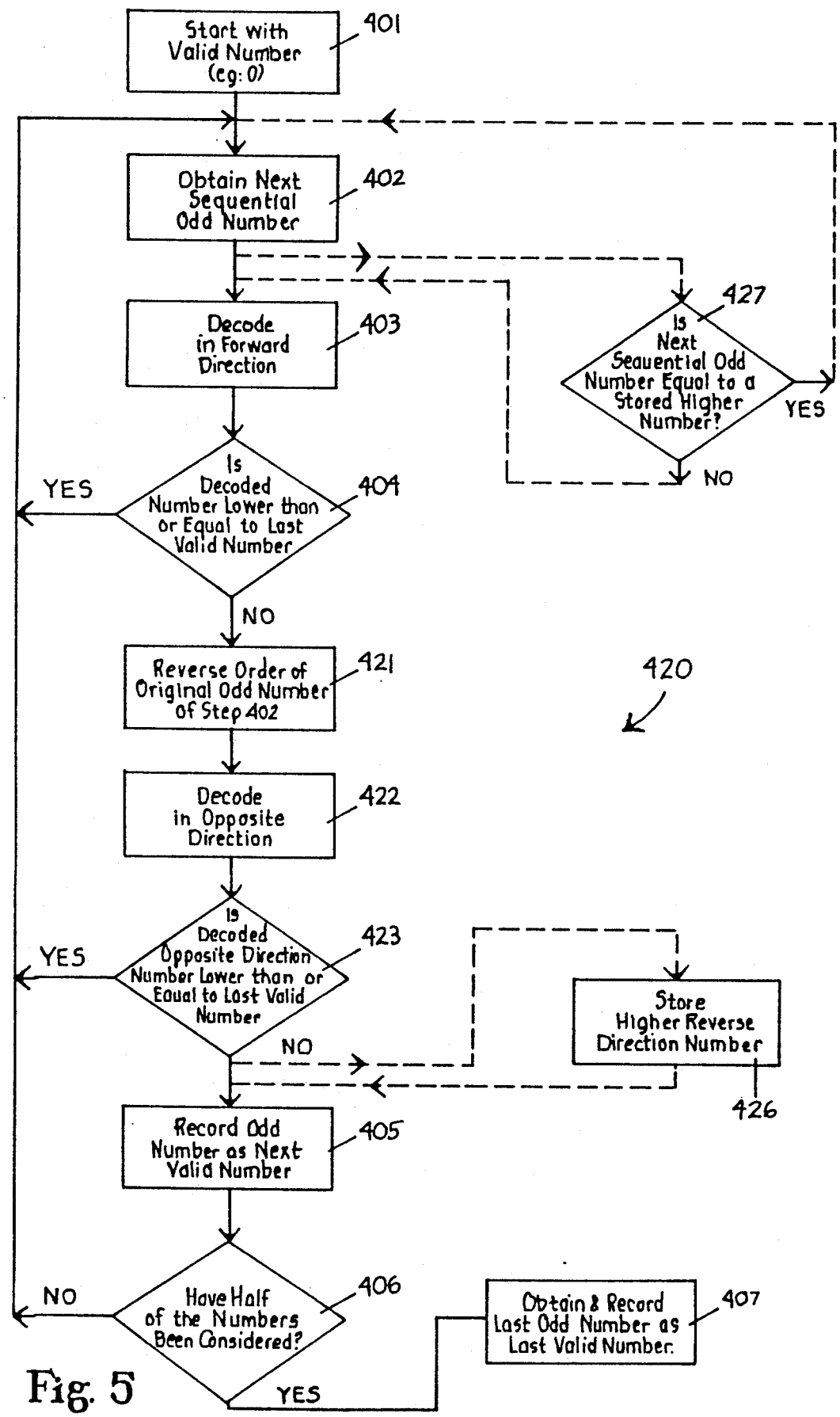
FIG. 5 is a flow chart similar to FIG. 4, wherein valid binary coded numbers are generated for two-way reading in either the forward or backward (reverse) direction.

When it is possible to read the binary numbers in two directions, such as on casino chips because they get flipped, then some additional steps must be carried out in order to determine ("count") valid numbers. A flow chart 420 illustrating a method for determining or counting valid numbers from the series of binary numbers possible for a given number of codable places which can be read in either direction is depicted in FIG. 5. Steps 401 through 404 in the flow chart of FIG. 5 are identical to steps 401 through 404 in the flow chart of FIG. 4. In step 404, if the decoded number is lower than or equal to the last valid number, then it is not a valid number and the flow chart reverts to step 402, as in the flow chart of FIG. 4. If the decoded number is not lower than or equal to the last valid number, then the number must be decoded as read in the opposite direction before it can be considered as a valid number. Opposite direction reading and decoding is accomplished in steps 421 and 422. In step 423, the method determines whether the decoded opposite direction number is lower than or equal to the last valid number. If it is, then it is not a valid number and the flow chart reverts to step 402. If it is higher, then that number is a valid number regardless of the direction it is read and decoded in, and it is therefore recorded as a valid number in step 405. The method then proceeds to steps 406 and 407 as in the method of the flow chart of FIG. 4.

Thus, in the flow chart of FIG. 5, an odd number is not considered to be valid unless it is valid as read in both a forward and reverse direction. If reverse direction decoding produces the same value as forward direction decoding, then the odd binary number is not only valid, but its binary representation is also symmetrical. If the reverse order decoding produces a higher odd number than the odd number started with, then the odd number started with is a valid number.

The method illustrated in FIG. 5 for two-way reading may be altered to include steps 426 and 427 to shorten the process. Step 426 follows step 423 and step 427 follows step 402. If in step 423 the decoded opposite direction number is higher than the last valid number, then the decoded opposite direction number is stored in step 426 and the method then proceeds to step 405. In step 427 these stored numbers are compared to the next sequential odd number obtained in step 402. In step 427, if the next sequential odd number is equal to a stored number, it means that that next sequential odd number is not a valid number, and it is discarded and the method reverts to step 402. If it is not equal to a stored number, then the method proceeds to step 403 to determine whether it is a valid number.

Another method for counting, referred to herein as "constructing" does not require decoding and does not require consideration of sequential odd numbers. The constructing method is more direct in that it proceeds from one valid number to the next. To go from one one-way valid number to the next, according to the constructing method, the next valid number is constructed from the preceding valid number. The constructing method is described below using a six digit binary system in which there are 14 one-way valid numbers. The six bit binary series begins as follows:

| | |
|---|---|
| 000000 | (decimal 0) |
| 000001 | (decimal 1) |
| 000011 | (decimal 3) |
| 000101 | (decimal 5) |
| 000111 | (decimal 7) |

As discussed above, decimal 0 and each of the above four odd numbers are valid since none can be rotated (shifted cyclically) into a position of lesser value. Four odd numbers could be obtained by constructing, but the steps involved would be too trivial for purposes of explanation. Therefore, the constructing method is described starting with 000111.

To obtain the next valid number greater than "000111" the first step is to increase it minimally, namely by one:

001000 (decimal 8); invalid

The result is obviously not valid, since it has trailing zeroes. The portion preceding the trailing zeros, "001", however is valid in a three-place system, and would be valid in six places if shifted to the right through the trailing zeroes, thereby reverting to "000001". This number must not be shifted, however, because a valid number greater than decimal 7, and also greater than decimal 8 is required.

The second step is to "replicate" "001" (the portion preceding the trailing zeroes) "into" the trailing zeroes. To replicate, the trailing zeroes are deleted and the remaining part of the number which preceded the trailing zeroes is repeated as many times as necessary to obtain at least the number of places in the coding system being used, which is six places in this example. If the replicated number which results has exactly the number of places of the coding system, i.e., the replicated number is an exact fit with the number of places of the coding system, then the replicated number is the next valid number. If, after replication, the number of places exceeds that of the coding system, the excess places are discarded and the result is increased by one. If there are then no trailing zeroes, that is the next valid number. If there are trailing zeroes replication is repeated.

Thus, replicating "001" into "001000" is accomplished as follows: delete trailing zeroes to obtain "001"; insert another "001" at end of "001" to obtain "001001". The replicated number is an exact fit, so it is the next valid number.

To obtain the next valid number add one in step 1 to obtain:

001010 (decimal 10) invalid

In step 2, replicate "00101" into "00101" to obtain:

001010.0101

In step 3, discard the overflow "0101". Since "001010", which is left after discarding the overflow "0101", is not a full replication, it is invalid. Add one (in effect returning to the first step) to obtain:

001011 (decimal 11); valid

Since there are no trailing zeroes, the result is the next valid number.

To obtain the next valid number, add one in step 1 to obtain:

001100 (decimal 12); invalid

In step 2, replicate to obtain;

001100.11

In step 3, discard the overflow which yields an invalid number, and revert to step 1 and add one to obtain:

001101 (decimal 13); valid

Since there are no trailing zeroes, the number is valid.

To obtain the other valid numbers repeat steps 1 through 2 or 1 through 3 as follows:

| | |
|---|---|
| 001110 | (decimal 14); invalid |
| 001110.0111; | discard overflow and add one to obtain: |
| 001111 | (decimal 15); valid; add one to obtain: |
| 010000 | (decimal 16); invalid; replicate "01" twice to obtain: |
| 010101 | (decimal 21); valid, add one to obtain: |
| 010110 | (decimal 22); invalid; replicate to obtain: |
| 010110.1011 | discard excess and add one to obtain: |
| 010111 | (decimal 23); valid |
| 011000 | (decimal 24); invalid |
| 011011 | (decimal 27); valid |
| 011100 | (decimal 28); invalid |
| 011101.11 | |
| 011110 | (decimal 30); invalid |
| 011110.1111 | |

| | |
|---|---|
| 011111 | (decimal 31); valid |

The last added "1" takes the place of the discard in ensuring that the result is valid.

| | |
|---|---|
| 100000 | (decimal 32); invalid |
| 111111 | (decimal 63); valid |

(Replicating a solitary 1 into five trailing zeroes filled the row exactly.)

Summarizing steps: Add one; replicate (if exact fit, stop); discard overflow; add one (if no trailing zeroes, stop); replicate, etc.

It is possible to use the inventive coding/decoding system for numbers of any base, i.e., binary, ternary, octal, decimal, hexadecimal, etc. Take a random conventional decimal number, for example, 4321 (or 4321. with the decimal point). In a four place decimal example of the coding system, 4321 can also be read as 3214, 2143, 1432 and, read backwards, as 1234, 2341, 3412, 4123 since no specific decimal point is used or implied. In the coding/decoding system of the invention, each of these representations has the same meaning, i.e., each is equivalent. In practice, it is usually most efficient to deal with either the lowest or the highest possible representation 4321 can have; 1234 or 4321, respectively. As above, the lowest representation is preferred as the valid number. To decode, all possible representations of the number (eight in this example), are compared to obtain the lowest representation, and hence the valid number, 1234 is obtained.

Programs can be assembled by those of skill in the art to automatically carry out on processing apparatus the above and other methods of providing unique shifted sets of coded information. Indeed, although not presented herein, applicants have programmed the methods described herein.

Figure 6:
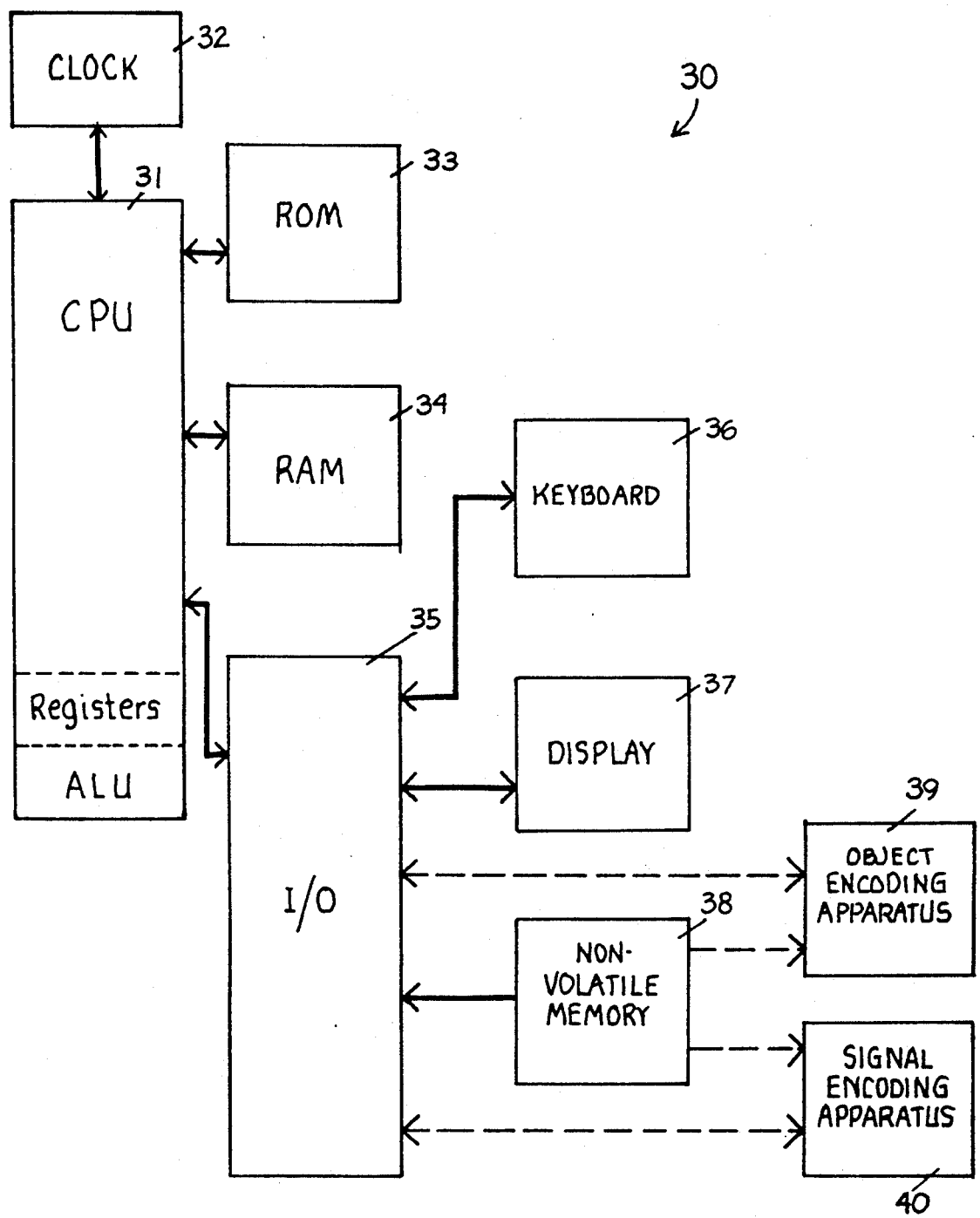
FIG. 6 is a block diagram of processing apparatus for generating coded information, and applying it to objects or encoding for generating coded information.

Apparatus for encoding gambling chips with valid numbers may be provided with information as to what binary numbers are valid "on-the-fly" as generated by the above methods, or from memory devices such as a floppy disc, addressable read only memories, random access memories or via modems, etc. Conventional processing apparatus may be utilized to provide unique shifted sets of binary information according to the disclosure herein. For example, the computing system 30 depicted in FIG. 6 may be programmed to generate such numbers and display and/or store the generated numbers. Computing system 30 includes a central processing unit (CPU) 31, a clock 32, read only memory (ROM) 33, random access memory (RAM) 34, input/output interface (I/O) 35, keyboard 36, display 37 and a non-volatile memory 38. The program for operating computing system 30 is contained in ROM 33. CPU 31 controls operation of computing system 30 in accordance with the program and performs required computations in an arithmetic logic unit (ALU) thereof. Information and addresses utilized in executing the program and carrying out computations, and for controlling other elements of the system may be stored in registers contained in CPU 31. In addition, RAM 34 may temporarily store information generated during execution of the program as well as shifted sets of information generated as a result thereof.

Information may be entered into system 30 by keyboard 36 via I/O 35, and information generated by the system including shifted sets of information may be displayed on display 37 (e.g., an LED (light emitting diode) display, LCD (liquid crystal device), printer, CRT (cathode ray tube), etc.). The shifted sets of information generated by system 30 may be stored via I/O 35 in external non-volatile memory 38 for use in applying the information to objects or encoding a signal with the information. I/O 35 may be directly coupled to object encoding apparatus 39 and/or signal encoding apparatus 40; also memory 38 may be removed from system 30 and coupled to object encoding apparatus 39 and/or signal encoding apparatus 40, which respectively encode objects and signals with the shifted sets of information.

Coded Gambling Chips

Figure 7:
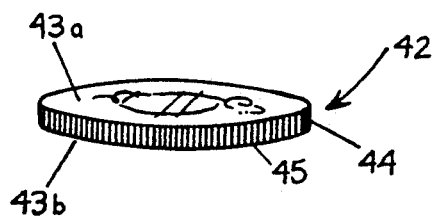
FIG. 7 is a perspective view of a gambling chip having 90 schematically represented code elements disposed juxtaposed extending circumferentially about the periphery of the chip arranged in a single layer for two-way reading.
Figure 8:
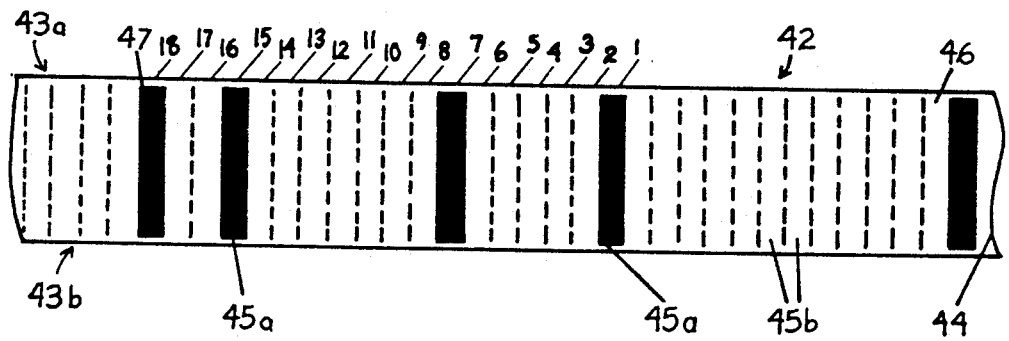
FIG. 8 is an enlarged schematic representation of a side view of a part of the chip periphery depicted in FIG. 7.

Referring to FIGS. 7 and 8, a gambling chip 42 is depicted which includes spaced opposed faces 43a, 43b and a peripheral portion 44 joining the opposed faces extending laterally about chip 42 axially between opposed faces 43a, 43b. The peripheral portion 44 is encoded with randomly selected coded information in a code 44 of thirty code elements or codable positions which are repeated three times for a total of 90 codable positions, of which about 36 are shown. Each code element 45a, 45b has an axial extent and a circumferential or lateral extent, and the code elements are laterally juxtaposed and uniformly arranged extending laterally about the edge of the chip. Together the code elements define a code extending about the circumference of the chip as shown. In FIG. 8, the black (dark) stripes 45a represent logical ones and the white (light) stripes 45b represent logical zeroes. The code 44 extends about the periphery of the chip 42 in a single circumferential layer, and may be read either clockwise or counter-clockwise, i.e., the chip is encoded for two-way (forward or reverse order) reading with the chip either right side up or upside down in a chip rack. The chip shown in FIG. 8 includes thirty consecutive code elements extending from position 46 to position 47 inclusive and is repeated three times (not shown). The 30 element code encoded on chip 42 decodes to, with forward and reverse being considered, 100000100000001001 (the 12 leading zeros have been dropped), or, using the novel coded notation, $+1-5+1-7+1-2+1$ (the 12 leading zeroes, $-12$, have been dropped).

In general, the minimum number of valid numbers obtainable from a "two-way" readable code is given by the formula $2^N/2N$ where N is the number of code elements or codable positions in the code. (The actual number of valid numbers is always slightly more than the minimum.) For the thirty codable position code 44, the minimum number of valid code numbers is 17,895,697. A twenty-four position binary system has 16,777,216 unique binary numbers, so that the coding/decoding system of the invention only gives up six codable positions in discarding invalid numbers as described above.

The invention thus allows use of coded information without regard to any specific starting point or other reference, and/or without regard to forward or reverse order of the "digits".

The invention provides the capability of utilizing a binary code without a specific notation for the binary digits, i.e., the binary "1" and the binary "0" can have interchangeable connotation in a given situation. The following example illustrates this aspect and its application with respect to a gambing chip. Two oppositely slanted surfaces (which are otherwise the same) can be used as the two levels of binary logic on gambling chips.

The surfaces may be flat (e.g., rectangularly-shaped), slanted from bottom to top to represent one binary level and slanted from top to bottom to represent the other binary level. Contrasting slanted surfaces "reflect" energy in two different ways (e.g., two directions) which enables the binary levels to be distinguished. One embodiment of a reading apparatus for reading the binary levels defined by the slanted surfaces comprises two discrete sensors in association with one emitter for each codable position, one sensor above and one below the emitter. Even if the surfaces are only slightly slanted, they could be read quite reliably because one sensor (above or below) would receive more energy than the other from the respective emitter, depending on the particular direction of the slant being sampled.

When a chip with contrasting slanted surfaces is turned upside down, the effect is to produce the complementary binary pattern or coded number, in reverse order, as opposed to reading black and white stripes where there is no change in the specific binary digit read when the chip is turned upside down. Effectively, all white stripes become "black" and vice versa as the orientation of the chip changes in reference to time. This method of using the coding system wherein the binary logic levels are interchangable is called two-way (reverse) complement reading.

Flipping the chip, can thus produce a reverse order reading, or, complementary reverse order reading. In both cases, about 18 million valid numbers are produced by 30 binary digits. The formulae for both are described below.

The formula for determining the exact one-way yield of valid binary numbers in a system with N code elements (codable positions). where N is a prime number is:

$$\frac{2^N - 2}{N} + 2$$

The reason for the "minus" 2 in the formula is that the all 0's and the all 1's numbers, which are always the first and last valid numbers no matter how many codable positions are used, always form groups with only one chip in them and need be considered separately. These are the only groups that can contain one chip in the preferred system. All other groups must contain two or more chips. Indeed, for the most part, for any larger N in a one-way system, most groups will contain N chips and in a two-way system, 2N chips. In any case, 2, for the all 0's and all 1's numbers must be subtracted before the division and then added back as shown.

When N is a composite number, the formula is more complicated. The general formula for the exact one-way yield when N is any composite number is too cumbersome to present herein and is not needed for present purposes. In any case, once the one-way result ("OW") is known the following formulae can be used to determine the exact two-way results:

Two-Way Complement, if $N$ is odd: $OW/2$

Two-Way Complement, if $N$ is even: $\frac{OW}{2} + 2^{\frac{N}{2}-2}$

For two-way reverse, where the two-way complement result is known (Complement):

$$\text{Complement} + 2^{\frac{N-2}{2}} \text{ rounded up}$$

Table IV below illustrates for a code having 0-33 code elements (codable positions), the number of unique binary numbers available and the actual number of valid numbers which can be obtained with one-way reading, two-way complement reading and two-way reverse reading.

TABLE IV

| Number of Binary Places/ Conventional Numbers They Can Represent | | Actual Yield of Valid Numbers: One-Way | Actual Yield of Valid Numbers: Two-Way Complement | Actual Yield of Valid Numbers: Two-Way Reverse |
|---|---|---|---|---|
| 0 | 1 | 1 | 1 | 1 |
| 1 | 2 | 2 | 1 | 2 |
| 2 | 4 | 3 | 2 | 3 |
| 3 | 8 | 4 | 2 | 4 |
| 4 | 16 | 6 | 4 | 6 |
| 5 | 32 | 8 | 4 | 8 |
| 6 | 64 | 14 | 9 | 13 |
| 7 | 128 | 20 | 10 | 18 |
| 8 | 256 | 36 | 22 | 30 |
| 9 | 512 | 60 | 30 | 46 |
| 10 | 1024 | 108 | 62 | 78 |
| 11 | 2048 | 188 | 94 | 126 |
| 12 | 4096 | 352 | 192 | 224 |
| 13 | 8192 | 632 | 316 | 380 |
| 14 | 16384 | 1182 | 623 | 687 |
| 15 | 32768 | 2192 | 1096 | 1224 |
| 16 | 65536 | 4116 | 2122 | 2250 |
| 17 | 131072 | 7712 | 3856 | 4112 |
| 18 | 262144 | 14602 | 7429 | 7685 |
| 19 | 524288 | 27596 | 13798 | 14310 |
| 20 | 1048576 | 52488 | 26500 | 27012 |
| 21 | 2097152 | 99880 | 49940 | 50964 |
| 22 | 4194304 | 190746 | 95885 | 96909 |
| 23 | 8388608 | 364724 | 182362 | 184410 |
| 24 | 16777216 | 699252 | 350650 | 352698 |
| 25 | 33554432 | 1342184 | 671092 | 675188 |
| 26 | 67108864 | 2581428 | 1292762 | 1296858 |
| 27 | 134217728 | 4971068 | 2485534 | 2493726 |
| 28 | 268435456 | 9587580 | 4797886 | 4806078 |
| 29 | 536870912 | 18512792 | 9256396 | 9272780 |
| 30 | 1073741824 | 35792568 | 17904476 | 17920860 |
| 31 | 2147483648 | 69273668 | 34636834 | 34669602 |
| 32 | 4294967296 | 134219796 | 67126282 | 67159050 |
| 33 | 8589934592 | 260301176 | 130150588 | 130216124 |

| Number of Binary Places/Conventional Numbers They Can Represent | | | Actual Yield of Valid Numbers: One-Way | Minimum Yield N 2/2N Two-Way | |
|---|---|---|---|---|---|
| 34 | 17.18 | 9th | 505,294,128 | 252.65 | 6th |
| 35 | 34.36 | 9th | 981,706,832 | 490.85 | 6th |
| 36 | 68.72 | 9th | 1,908,881,890 | 954.44 | 6th |
| 37 | 137.44 | 9th | 3,714,566,312 | 1.86 | 9th |
| 38 | 274.88 | 9th | 7,233,642,930 | 3.62 | 9th |
| 39 | 549.76 | 9th | 14,096,303,344 | 7.05 | 9th |
| 40 | 1.10 | 12th | 27,487,816,992 | 13.74 | 9th |
| 41 | 2.20 | 12th | 53,634,713,552 | 26.82 | 9th |
| 42 | 4.40 | 12th | 104,715,443,852 | 52.36 | 9th |
| 43 | 8.80 | 12th | 204,560,302,844 | 102.28 | 9th |
| 44 | 17.59 | 12th | 399,822,505,524 | 199.91 | 9th |
| 45 | 35.18 | 12th | 781,874,936,816 | 390.94 | 9th |
| 46 | 70.37 | 12th | 1,529,755,490,574 | 764.88 | 9th |
| 47 | 140.74 | 12th | 2,994,414,645,860 | 1.50 | 12th |
| 48 | 281.48 | 12th | 5,864,062,367,252 | 2.93 | 12th |
| 49 | 562.95 | 12th | 11,488,774,559,636 | 5.74 | 12th |
| 50 | 1.13 | 15th | 22,517,998,808,028 | 11.26 | 12th |
| 51 | 2.25 | 15th | 44,152,937,528,384 | 22.08 | 12th |
| 52 | 4.50 | 15th | 86,607,686,432,616 | 43.30 | 12th |
| 53 | 9.01 | 15th | 169,947,155,749,832 | 84.97 | 12th |
| 54 | 18.01 | 15th | 333,599,974,893,066 | 166.80 | 12th |
| 55 | 36.03 | 15th | 655,069,036,708,592 | 327.53 | 12th |
| 56 | 72.06 | 15th | 1,286,742,755,471,400 | 643.37 | 12th |
| 57 | 144.12 | 15th | 2,528,336,632,928,152 | 1.26 | 15th |
| 58 | 288.23 | 15th | 4,969,489,253,251,428 | 2.48 | 15th |
| 59 | 576.46 | 15th | 9,770,521,225,481,756 | 4.89 | 15th |
| 60 | 1.15 | 18th | 19,215,358,428,046,176 | 9.61 | 15th |
| 61 | 2.31 | 18th | 37,800,705,069,076,952 | 18.90 | 15th |
| 62 | 4.61 | 18th | 74,382,032,589,917,286 | 37.19 | 15th |
| 63 | 9.22 | 18th | 146,402,730,743,793,240 | 73.20 | 15th |
| 64 | 18.45 | 18th | 288,230,376,218,822,676 | 144.12 | 15th |
| 65 | 36.89 | 18th | 567,592,125,344,909,792 | 283.80 | 15th |
| 66 | 73.78 | 18th | 1,117,984,489,446,008,100 | 558.99 | 15th |

All Actual Yield data in Table IV for 0-16 places inclusive was obtained empirically using software run on an Hp 41CV; the valid numbers were obtained by counting. One way actual yield data was also counted on the HP 41CV for 17-21 places inclusive. Formulae confirm all findings. Formulae were used to produce the remaining data. For 34 places and higher, two-way actual yield data is not provided; this data is always only slightly higher than the minimum yield data for N of any significant size.

Figure 9:
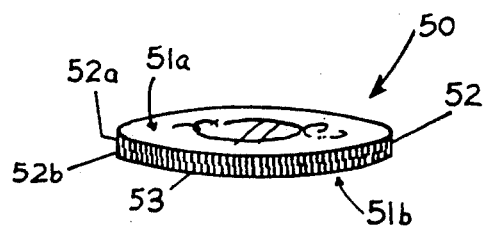
FIG. 9 is a perspective view of a gambling chip having 36 schematically represented code elements extending circumferentially about the chip periphery arranged in two layers for one-way reading.
Figure 10:
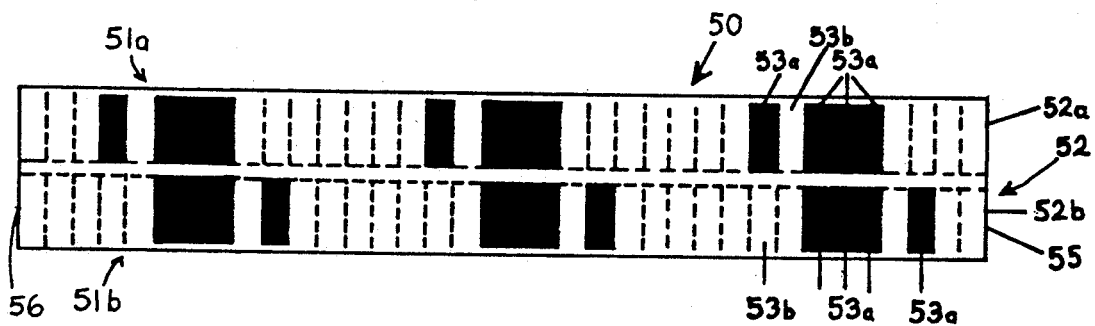
FIG. 10 is an enlarged schematic representation of a side view of the entire periphery of the chip depicted in FIG. 9.

Chips may alternatively be encoded so that the code is read and considered in one direction only. As depicted in FIGS. 9 and 10, this may be accomplished by encoding the periphery of a chip 50 in two layers 52a, 52b of thirty-six code elements extending about the chip periphery, with a 12 element code 52 repeated three times in each layer. Each layer of code elements is read in only one direction and is encoded with the identical valid binary number, one layer (e.g., 52a) having the valid binary number extending clockwise about the periphery of the chip and other layer (i.e., 52b) having the valid binary number extending counterclockwise. No specific orientation is required between layers 52a and 52b; they can be rotated in any orientation relative to each other on a round chip. Ends 55 and 56 are, in reality, adjacent each other in this particular in FIG. 10 are encoded in a 12 place system with the binary number "000101110000" repeated three times (black stripes 53a representing logical ones and white stripes 53b representing logical zeroes). To read the code elements, the reading apparatus is positioned to read along half (top only or bottom only) the axial height of the chip periphery in one direction only so that one layer 52a or the other layer 52b, depending upon the orientation of the chip to the reading apparatus, is read, and whichever layer is read, it is always read in the same direction and therefore the same valid number will be obtained no matter how the chip is oriented, i.e., rightside-up or up-side-down as shown in FIG. 10.

Figure 11:
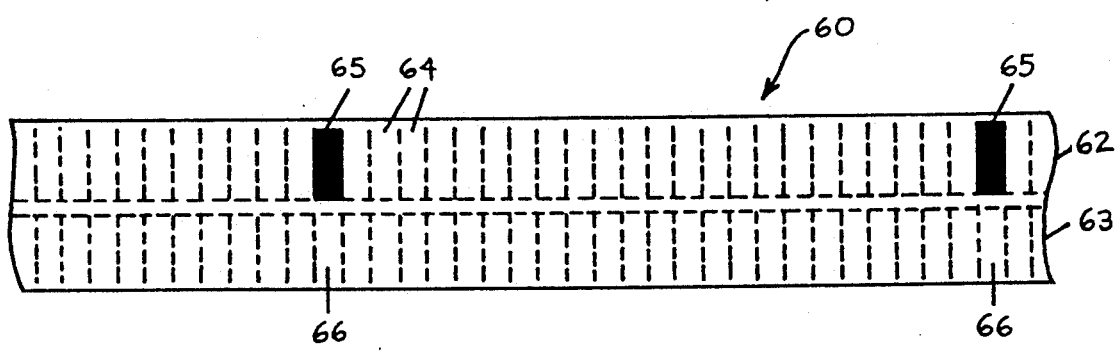
FIG. 11 is a side view of a part of a gambling chip having two layers of 72 schematically represented code elements, which extend circumferentially about the periphery of the chip for one or two-way reading, one layer of which includes a code element encoded as a starting point.

Although it is preferred that chips be encoded without a starting point or other reference as described in connection with FIGS. 7 and 8, the chips may alternatively be encoded with a starting point. Referring to FIG. 11, a chip 60 is depicted having a total of seventy-two code elements arranged about its periphery in two layers 62 and 63, as described in connection with FIGS. 9 and 10. Since the code has a starting point in layer 62, no binary numbers have to be discarded, and a code of twenty-four elements provides approximately the same number of valid numbers as does a thirty element code when no starting point is used, as in FIGS. 7 and 8. The code defined in layer 63 (shown as all zeroes) may be two-way readable, as described for the single layer of chip 42 in FIG. 7, but this will provide less valid numbers. Two-way valid codes are described more fully below. It is preferred and quite possible that the code in layer 63 be read and considered in one direction only. The code in layer 62 includes 23 logical zeroes 64 and one logical one 65 for each set of twenty-four code elements, the logical one's 65 defining a specific starting point adjacent the (first) code element 66 in layer 63. Although a code of 23 logical zeroes and one logical one was used to designate the starting point in layer 62 for the code in layer 63, the opposite may be used, i.e., 23 logical ones and one logical zero. Similarly, any other codes in layer 62 may be used to designate a specific starting point for the binary information in layer 63. It is understood that one starting point is encoded in layer 62 for each repetition of the encoded code in layer 63.

In order to read the two layers of code from chip 60, reading apparatus is provided which reads both layers 62 and 63 of code elements separately, either simultaneously or sequentially. As mentioned above, when this method is used, one-way reading is preferred since the reading direction can readily be determined once the starting point layer 62 is identified (by reading the starting point layer 62 from the top or bottom layer, it is known whether to read the other layer 63 clockwise or counterclockwise). The starting point for the binary information of layer 63 need not be adjacent the logical one of layer 62; it may be arbitrarily assigned to any particular code element of layer 63 relative to layer 62.

Figure 12:
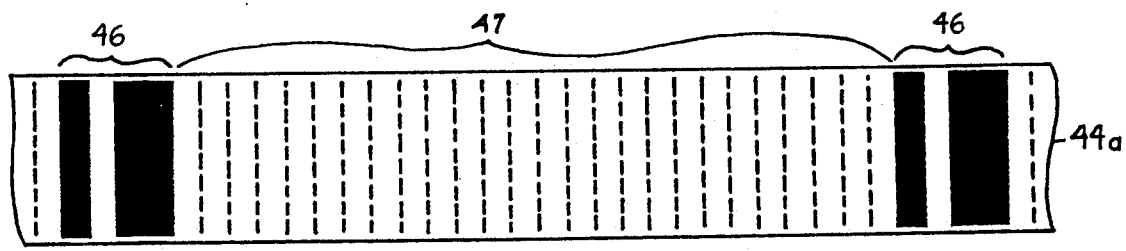
FIG. 12, is a side view of part of a casino chip similar to that of FIG. 8 but encoded with a starting point.

It is also possible to encode a starting point with reading direction suggested in the code elements of just one layer 44a which also contain the code, i.e., a code within a code; this may be called a fabricated starting point and is shown in FIG. 12. To enable the code for the fabricated starting point to be uniquely identified, essentially the starting point code 46 and the valid code numbers 47 (shown with all logical zeroes) are selected so that the starting point code 46 does not interfere with the valid code number 47, (46 and 47 together comprising one complete set of 30 code elements), i.e., code 46 does not appear in or otherwise interfere with the valid number portions 47 encoded on the chip. A starting point code of four or five code elements may be used, although more elements could also be utilized.

For example, the four-digit fabricated starting code 46 "1011", shown in FIG. 12 may be used; it gives "directionability" to allow for up-side-down chips, while "101" should not be used in this example since it is symmetrical and therefore does not suggest a direction to read the code. Further, "011" is not a possible fabricated start code for the reason described below.

In order to use "1011" as a start code, it can only appear once in a given complete code number, 46 and 47. In certain rare cases, however, "1011" can appear two or more times within the 30 code elements and still function as a fabricated starting code. For example, when the portion of the valid code number 47 between the two or more appearances of 1011 within the 30 code elements is identical, any of the "1011" start codes will suffice to be recognized as the fabricated starting point since the valid coded number read from any such start code will be the same and will include the other "1011" code(s) with no adverse effect.

When read up-side-down, "1011" becomes "1101" and still suggests the direction in which to read the valid coded number portion. Immediately following the "1011" starting point code, the valid coded number 47 for the chip can appear. In other words, the "1011" or the "1101" will be identified and then the valid coded number 47 that follows is read in the appropriate direction suggested. Further restrictions, however, exist in the use of "1011" as a start code. "1011" cannot be preceded by a 1 because "11011" would mask directionality in all but a few rare cases, e.g., when the valid coded number is the same forwards or backwards (symmetrical). This effectively makes the four digit starting point code five digits: "01011".

For a given number of codable positions, more chips can be coded with valid numbers if a code is used without a fabricated starting point as described in connection with FIGS. 7 and 8. In a code with thirty codable positions, five are effectively used for the fabricated starting point even before the restrictions such as those discussed above are addressed. Moreover, referring to the description of FIGS. 1-3, by way of illustration, not all "groups" will contain the (five digit) starting point code of this example. Also, some groups will contain more than one appearance of the starting point code, which in most cases creates a conflict. Therefore, one chip from every group cannot be used as compared to the preferred system without any starting point (of FIGS. 7 and 8) where one chip from each and every group can be used. Therefore, less chips can be coded with valid numbers if a fabricated starting point is used.

"011" is not possible as a fabricated starting point because a second "0" cannot be adjacent to the "11" portion as this creates two "011" patterns, (i.e., "0110"), which means that only "011111111111111..." is possible if "011" were to be used as a fabricated starting point.

For a variety of theoretical and practical reasons, a fabricated starting point 46 is the second preferred way of coding casino chips; FIGS. 7 and 8 illustrating the preferred way.

Use of a fabricated starting point or other reference code, one-way and two-way reading, two layer codes, etc, may be used in combination with other aspects of the coding, reading and decoding methods of the invention.

The size of the code elements of the chips depicted in FIGS. 7-12 depends on the size of the chip and the total number of coded elements required. Given the standard size of casino chips, of about 1.5 inch diameter and 0.125 inch thickness, if 90 code elements are provided each of equal circumferential extent and uniformly disposed about the periphery of the chip, the circumferential extent of each code element is about 0.052 inch and the axial extent is the height of the chip, 0.125 inch (for a single code layer).

Figure 13:
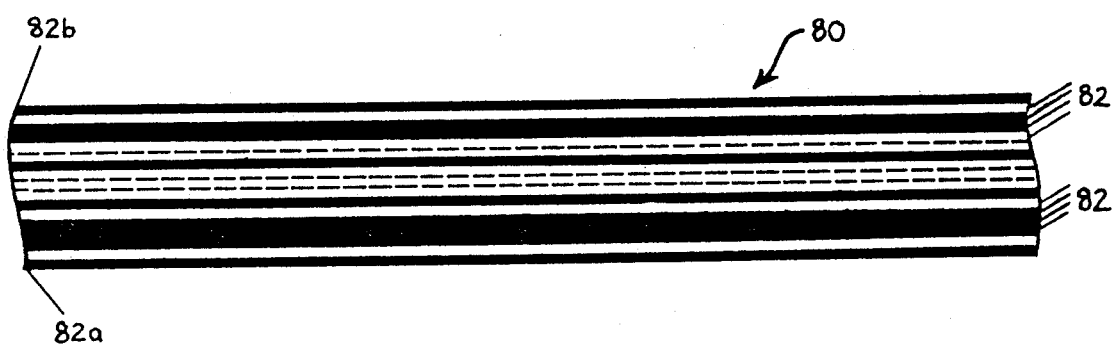
FIG. 13 is a side view of part of a gambling chip having code elements disposed juxtaposed extending axially along the periphery of the chip.

The code elements of the codes described in connection with FIGS. 7-12 are arranged to define a code having code elements which extend circumferentially about the periphery of the chip. It is also possible to arrange the code elements on the periphery of the chip to define a code which can be read axially. Referring to FIG. 13, a chip 80 is depicted having code elements 82 arranged in circles extending about the periphery of the chip. Each circle 82 defines one code element, with the code itself extending axially on the chip. Although the code elements are shown to be full circles, they need not be. However, circles are preferred so that it is unnecessary to orient the periphery of the chip relative to a chip rack since each code element extends entirely about the periphery of the chip. In order to encode about 17,000,000 chips which can be read right-side-up or up-side-down, 25 circumferential circles or strips extending around the edge of the chip may be used.

The formula for the number of codes available using this axial system when chips are used both right-side-up and up-side-down is:

$$\frac{2^N}{2} + \frac{2^{N/2} \text{ rounded up}}{2}$$

where N is the number of codable positions used.

For chips 80 having codable positions 82 as depicted in FIG. 13, the chip groups (referring to FIGS. 1-3) will contain only two chips, since valid coded numbers may be read starting from the top and the bottom of the chip (or merely read from either and then reversed). This allows for the chip to get flipped in the process of playing. Therefore, there can only be two different readings, no matter what the orientation of the chip or the reading direction, from top or bottom, and there can be no more than two chips in any one group. That is why 2 to the power of N divided by 2 accounts for most of the valid coded numbers. The valid coded numbers that have only one chip in a group are symmetrical, and half the quantity of symmetrical valid coded numbers is represented by the remainder of the formula. This has been determined both by empirical methods and combinatorial analysis. Once the lower of the two possible readings is determined by comparison or other decoding, it may then be considered the valid number. Given the thickness of 125 thousandths for a chip, a thickness, i.e., an axial extent, of each code element 82 for chip 80 (FIG. 13), of about 5 thousandths is available for each code element of a 25 element code. Because of the cumulative effect of tolerance variations in the thickness of the chip, axial alignment of the chips in the chip rack would be preferred. For example, a chip rack having grooves therein to accept chips may be used (see U.S. Pat. No. 3,306,462). Other practical problems exist, such as the adverse effect of small amounts of dirt and wear. About ten times more resolution is required to read chips 80 as compared to chips 42 (FIGS. 7 and 8).

Generating Two-Way Readable Coded Information

Valid two-way code for use on chips 80 of FIG. 13 can be generated as follows. Start with a valid number. Obtain the next higher sequential number. (All sequential numbers need to be obtained in turn in this step since both odd and even numbers may be valid and valid numbers may be found in the first and second half.) Compare the reverse order to see if the reverse order is lower. If the reverse order is lower, generate the next sequential number and repeat the step of comparing of the reverse order. If the reverse order is the same or higher, record or use the compared sequential number as valid. (If the reverse order is the same, the number is said to be symmetrical.) The process continues until all possible sequential numbers within a desired range have been thus considered. In this embodiment two possible starting points, created by the possibility of reading the code forward or backward, are considered.

Table V below illustrates the two-way valid coded numbers which six code elements yield for chips 80 of FIG. 13.

TABLE V

| Decimal Number | Binary Equivalent | Reverse Binary Number | Decimal Equivalent of Reverse Binary No. | Sequential Decimal No. assigned to Each Valid Code |
|---|---|---|---|---|
| 0 | 000000 | 000000 | 0* | 1 |
| 1 | 000001 | 100000 | 32 | 2 |
| 2 | 000010 | 010000 | 16 | 3 |
| 3 | 000011 | 110000 | 48 | 4 |
| 4 | 000100 | 001000 | 8 | 5 |
| 5 | 000101 | 101000 | 40 | 6 |
| 6 | 000110 | 011000 | 24 | 7 |
| 7 | 000111 | 111000 | 56 | 8 |
| 8 | 001000 | 000100 | 4 (invalid) | |
| 9 | 001001 | 100100 | 36 | 9 |
| 10 | 001010 | 010100 | 20 | 10 |
| 11 | 001011 | 110100 | 52 | 11 |
| 12 | 001100 | 001100 | 12* | 12 |
| 13 | 001101 | 011100 | 44 | 13 |
| 14 | 001110 | 011100 | 28 | 14 |
| 15 | 001111 | 111100 | 60 | 15 |
| 16 | 010000 | 000010 | 2 (invalid) | |
| 17 | 010001 | 100010 | 34 | 16 |
| 18 | 010010 | 010010 | 18* | 17 |
| 19 | 010011 | 110010 | 50 | 18 |
| 20 | 010100 | 001010 | 10 | |
| 21 | 010101 | 101010 | 42 | 19 |
| 22 | 010110 | 011010 | 26 | 20 |
| 23 | 010111 | 111010 | 58 | 21 |
| 24 | 011000 | 000110 | 6 (invalid) | |
| 25 | 011001 | 100110 | 38 | 22 |
| 26 | 011010 | 010110 | 22 | |
| 27 | 011011 | 110110 | 54 | 23 |
| 28 | 011100 | 001110 | 14 (invalid) | |
| 29 | 011101 | 101110 | 46 | 24 |
| 30 | 011110 | 011110 | 30* | 25 |
| 31 | 01111 | 111110 | 62 | 26 |
| 32 | 100000 | 000001 | 1 (invalid) | |
| 33 | 100001 | 100001 | 33* | 27 |
| 34 | 100010 | 010001 | 17 (invalid) | |
| 35 | 100011 | 110001 | 49 | 28 |
| 36 | 100100 | 001001 | 9 (invalid) | |
| 37 | 100101 | 101001 | 41 | 29 |
| 38 | 100110 | 011001 | 25 (invalid) | |
| 39 | 100111 | 111001 | 57 | 30 |
| 40 | 101000 | 000101 | 5 (invalid) | |
| 41 | 101001 | 100101 | 37 (invalid) | |
| 42 | 101010 | 010101 | 21 (invalid) | |
| 43 | 101011 | 110101 | 53 | 31 |
| 44 | 101100 | 001101 | 13 (invalid) | |
| 45 | 101101 | 101101 | 45* | 32 |
| 46 | 101110 | 011101 | 29 (invalid) | |
| 47 | 101111 | 111101 | 61 | 33 |
| 48 | 110000 | 000011 | 3 (invalid) | |
| 49 | 110001 | 100011 | 35 (invalid) | |
| 50 | 110010 | 010011 | 19 (invalid) | |
| 51 | 110011 | 110011 | 51* | 34 |
| 52 | 110100 | 001011 | 11 (invalid) | |
| 53 | 110101 | 101011 | 43 (invalid) | |
| 54 | 110110 | 011011 | 27 (invalid) | |
| 55 | 110111 | 111011 | 59 | 35 |
| 56 | 111000 | 000111 | 7 (invalid) | |
| 57 | 111001 | 100111 | 39 (invalid) | |
| 58 | 111010 | 010111 | 23 (invalid) | |
| 59 | 111011 | 110111 | 55 (invalid) | |
| 60 | 111100 | 001111 | 15 (invalid) | |
| 61 | 111101 | 101111 | 47 (invalid) | |
| 62 | 111110 | 011111 | 31 (invalid) | |
| 63 | 111111 | 111111 | 63* | 36 |

*indicates a symmetrical valid number.

Binary numbers having six code elements yield a total of 64 unique binary numbers as listed in the column "Binary Equivalent". Each unique binary number is identified at its left with the equivalent decimal number listed in the column headed "Decimal Number". The reverse binary number is shown in the column headed "Reverse Binary Number" as is the decimal equivalent in the column headed "Decimal Equivalent of Reverse Binary Number". Each valid number is represented by an entry in the column headed "Sequential Decimal Number Assigned to Each Valid Code Number" and these entries are numbered sequentially in decimal notation, 1 to 36. In some applications, data similar to the first and last columns, for example, may suffice as a look-up table.

It is also possible to use the higher of the two-way readings as the valid numbers. And it is possible to use both the forward order and the reverse order to identify a given chip. For example, referring to Table V, the binary equivalent of decimal 8 when reversed is decimal 4. Therefore, the binary equivalent of both decimal 8 and 4 may be used to identify a given chip. Care must be taken to use only 8 or 4 to code a chip, however. When the chip is read, either binary 8 or binary 4 will be read and either reading is equivalent for identification purposes. In this variation, (and other variations are possible as well) it would not be necessary to decode the readings from chips, and additional memory could be used instead for identification purposes.

Also, symmetrical numbers need not be used at all since they account for only a negligible number of codes when any significant number of code elements is used. If symmetrical numbers are not used, in this example, all numbers may be printed on chips except "all binary zeros" and "all binary ones." The result would be that, if no chips were flipped, one chip with 8 and one chip with 4 would be provided, and if either chip were flipped, it would read the same as the other. This effectively gives pairs of two chips with the same unique code, i.e., each chip of the pair of chips would not be distinguishable from the other when flipped.

The above is true for two-way, as well as for all the coding described above, in principle, and other variations are possible as well. In the description above of two-way readable codes, the lower of the two-way readable coded information was selected as the valid number.

Chip Racks And Chip Reading

Figure 14:
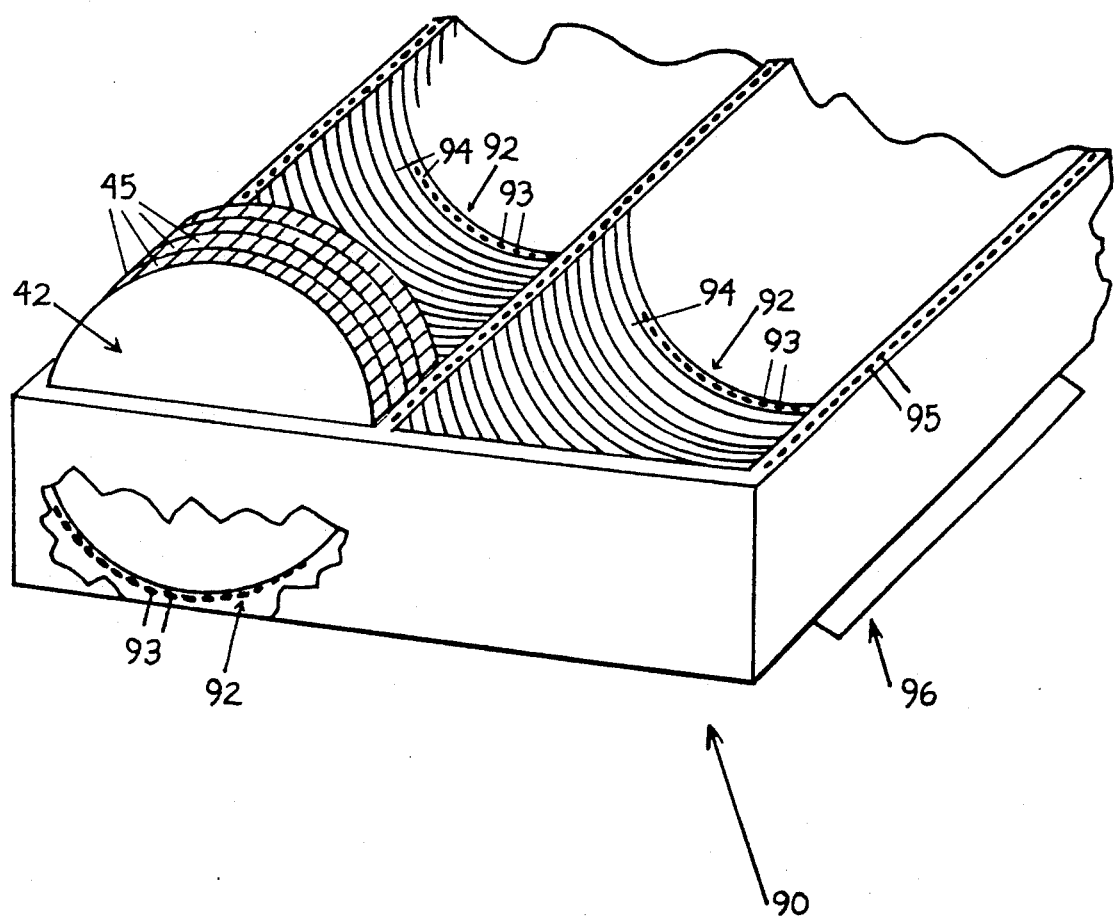
FIG. 14 is a front perspective view of a gambling chip rack containing chips of the type depicted in FIG. 7 and including reading apparatus.

Referring now to FIG. 14, a casino chip rack 90 for use at gaming tables is depicted which incorporates reading apparatus 92 for reading coded information from chips 42 having code elements 45 disposed in a code extending circumferentially about the periphery of the chip. The reading apparatus 92 is schematically illustrated as a set of discrete sensors 93 (e.g., a photosensitive device such as a light-responsive transistor or diode) for each chip location 94 as shown disposed to receive light reflected from the code elements 45 of the chips 42. From external appearances, the chip rack 90 resembles chip racks currently in use at many casinos since the reading apparatus 92 lies within the chip rack 90 and is covered when chips are placed in the rack. One difference is that the chip rack 90 depicted in FIG. 14 includes display devices in the form of light emitting diodes (LED's) 95 positioned to uniquely identify each chip location. Alternatively, a liquid crystal device (LCD) display may be used as could other indicators. Instead of individual indicators, a digital display can be provided in which a chip location is identified by a row number and column number. As a result, any chip or chips can be readily identified when an abnormal reading has been taken from the chip in the identified location or locations. An abnormal reading could be the result of a counterfeit chip, a damaged chip, or a chip from another casino, or one whose code was previously valid and was since invalidated, etc.

Another difference between the chip rack 90 depicted in FIG. 14 and those currently in use in casinos is the connector part 96, which is preferably disposed on the bottom of the chip rack. The connector part 96 is shown as a jack, and a mating plug (not shown) is provided so that electrical connection may be made simply by placing the rack 90 on a table or other supporting surface with the jack 96 in alignment with a plug disposed in or on the table. Advantageously, the connector is a quick-disconnect type which allows the rack 90 to be disconnected quickly, removed from one location, and transported to another location and quickly reconnected. The rack may also include some onboard electronics, preferably contained in one or more integrated circuits, which provide raw or processed information read from the chips 42 to the connector jack 96.

Figure 15:
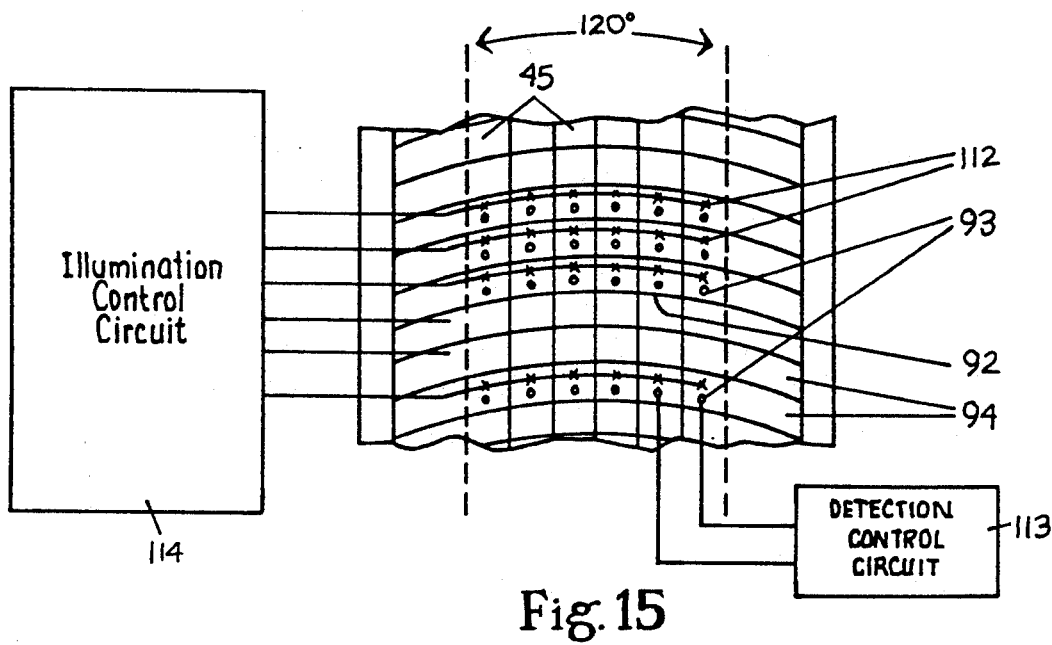
FIG. 15 is a schematic representation of optical reading apparatus having discrete sensors for reading the information encoded on chips of the type depicted in FIG. 7.

FIG. 15 depicts an embodiment of optical reading apparatus 92 for reading chips having code elements 45 disposed in a code extending circumferentially about the periphery of the chips. Referring to FIGS. 14–15, the reading apparatus 92 includes LED's 112 (designated by "x's") for illuminating the code elements 45 on the chips and photosensitive devices 93 (designated by "0's") for detecting the binary levels optically encoded on the chips. A reduced number of photosensitive devices 93, LED's 112, code elements 45, etc., are shown enlarged for a 120° arc, it being understood that at least as many photosensitive devices and LED's, etc. are present in the 120° arc as there are code elements to be read. The binary levels may be encoded as black and white for reflecting different light intensities and/or frequencies, by means of contrasting colors, by any means of creating two differing reactions to light of various characteristics such as frequency, e.g., infrared or ultraviolet, etc. As depicted schematically, the photosensitive devices 93 are disposed and spaced so that each one may receive light energy from only one of the code elements 45 on each chip. In the embodiment of FIG. 15, each photosensitive device 93 is individually connected to detection control circuit 113 which selectively addresses individual photosensitive devices to obtain the optical binary level sensed by respective photo-sensitive devices. The LED's 112 are interconnected in rows, one for each chip location 94, and illuminated by control circuit 114 sequentially or in unison, continuously, or on demand or only when a chip is disposed in a respective location as determined by a sensor which detects the presence of a chip in a respective location or by other means, e.g., if one location is found to be empty, then the adjacent higher location(s) would also be empty, etc.

Figure 16:
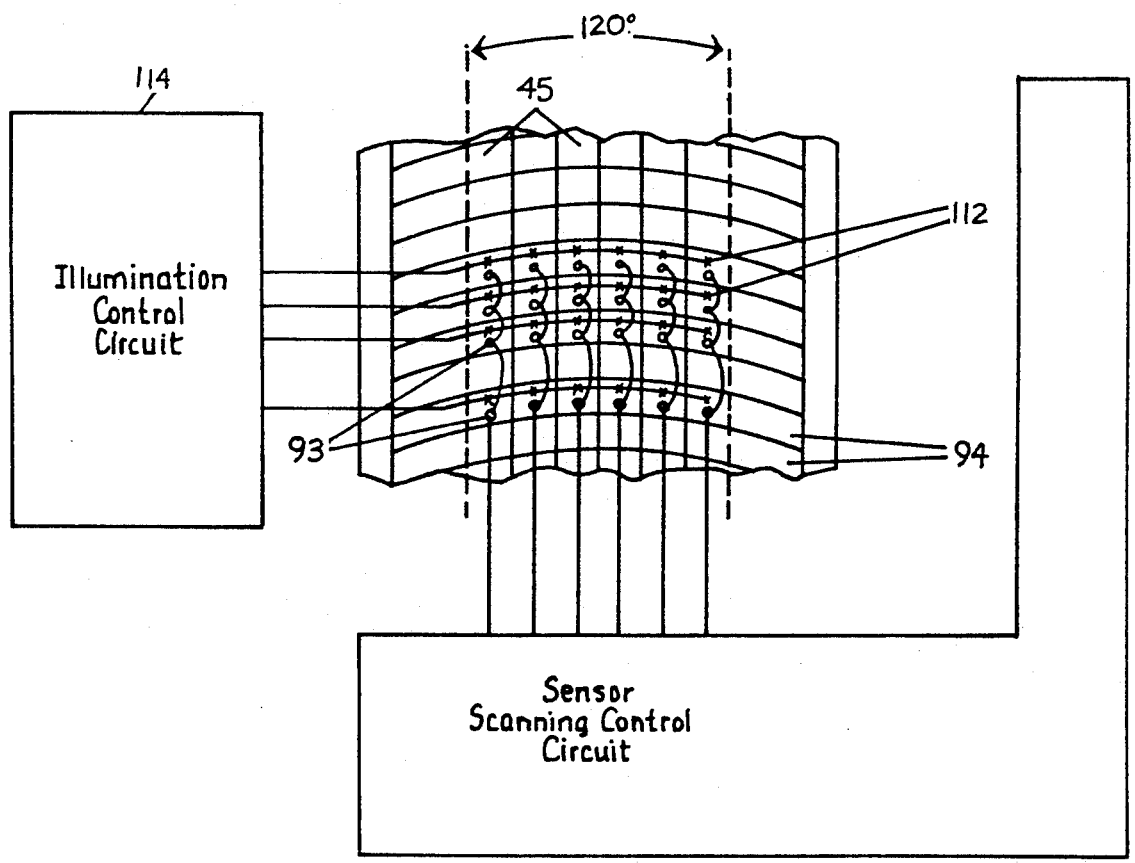
FIG. 16 is a schematic representation of optical reading apparatus having sensors connected in a matrix for reading information encoded on chips of the type depicted in FIG. 7.

In the embodiment of FIG. 16, the photosensitive devices 93 are connected in a matrix and addressed by a sensor scanning control circuit 116 which may sequentially select columns of code elements 45 for reading. The LED's 112 are illuminated by the control circuit 114, in accordance with control circuit 116's requirements.

Construction and operation of circuits 113, 114 and 116 are conventional and known to those of skill in the art.

Reading apparatus similar to that depicted in FIGS. 14–16 may be provided to read chips 80 (FIG. 13) having code elements 82 in a code extending axially along the chip. In such apparatus, the photosensitive devices 93 extend axially in the chip rack in correspondence with the axial disposition of the code elements.

Discrete photosensitive devices, one for each code element in each chip rack may be used, or alternatively, arrays of photosensitive devices can be built in lengths appropriate to accommodate the length of a column of chips and/or the width or arc of the chip portion to be read. The arrays are conformed to the interior shape of the columns of the chip racks. Alternatively, they may be flat if appropriate lengths of fiber optics, for example, are used to couple the light to each code element on of the chips and back to the array. The reflected light could be either visible to the naked eye or invisible (e.g., infrared) light. Infrared light detectors are essentially unaffected by the normal lighting of a casino. Such optical components described herein are well known in the art.

A matrix scanning apparatus, which reads binary levels encoded in code elements of chips by means of electrical properties (such as resistive, capacitive, etc.) may also be employed. The peripheral edge of such chips, for example, may include conductive strips each of which extend axially along the edge of the chip corresponding to code elements 45a in FIG. 8. The conductive strips may represent a logical 1 while the absence of conductive material in strips much as 45b in FIG. 8 represent a logical 0. This scanning apparatus includes conductors which extend adjacent the edge of the chips. Electrical signals applied to the matrix according to well-known techniques are affected by the presence or absence of the conductive strips on the edge of the chips. The signals in the matrix are detected to determine whether or not the codable positions on the edges of the chips include a conductive strip or not.

Figure 17:
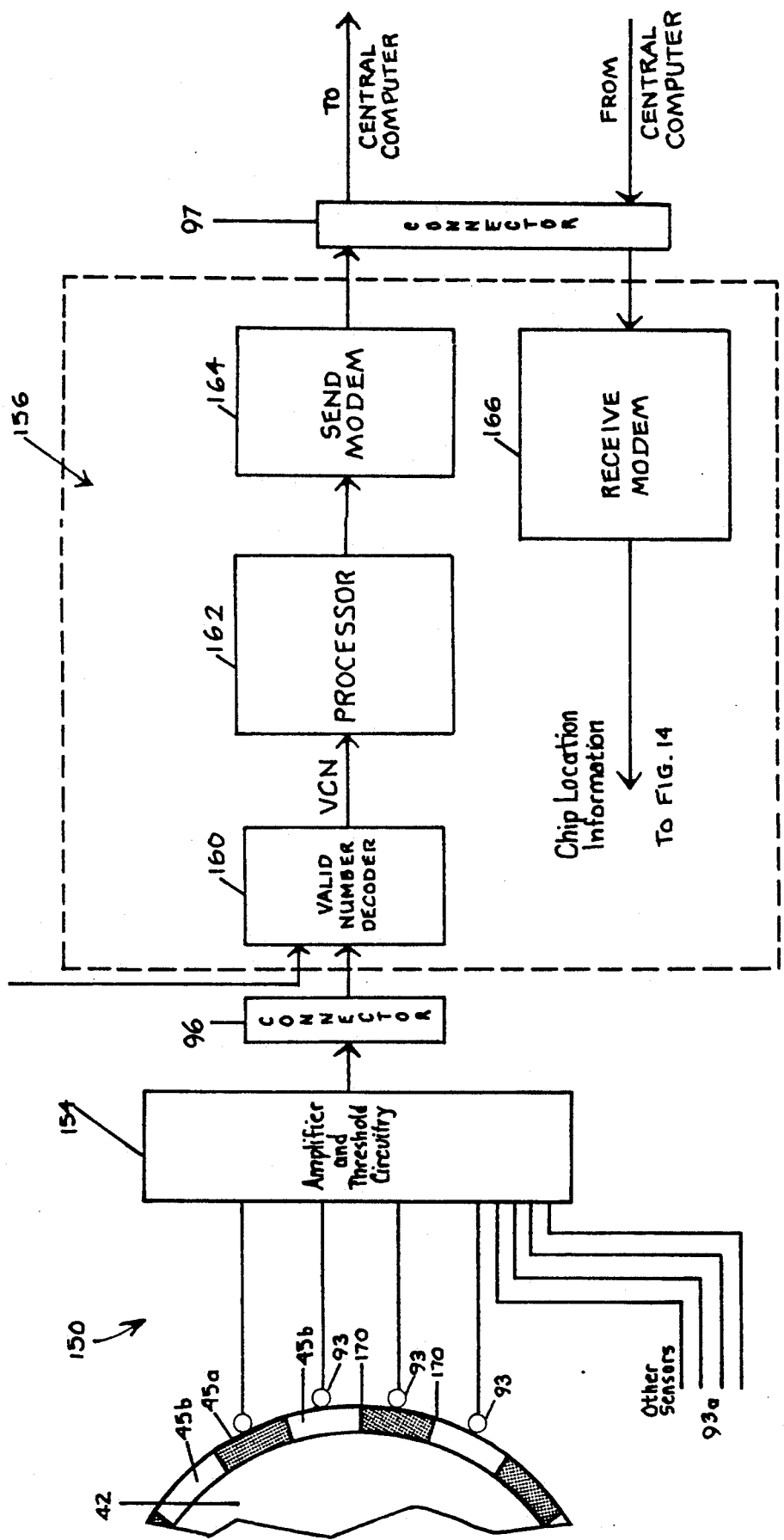
FIG. 17 is a schematic and block diagram representation of reading apparatus including an optical sensor arrangement and decoding circuitry therefor.

Referring now to FIG. 17, circuitry 150 is shown in block form for optically reading coded information encoded on the edge of a chip in the chip rack 90. Photosensitive devices 93 are spaced apart by the circumferential extent of the code elements 45 on the chip. The code elements and the photosensitive sensitive devices are shown out of scale with respect to the size of the chip and typically more photosensitive devices 93a would be used. The code elements may be illuminated by LED's (not shown in FIG. 17) and the photosensitive devices, in turn, have an output related to the amount of illumination received from the code elements. The outputs of the photosensitive devices 93 are connected to amplifier and threshold circuitry 154 which provides binary level outputs depending on whether the code elements on the chips are dark or light. The output of the amplifier and threshold circuitry 154, which may be serial or parallel, is coupled to the connector 96 in the chip rack. Decoding circuitry 156, colocated with the chip rack, is coupled to the connector 96. In the embodiment depicted in FIG. 16, the decoding circuitry 156 is not disposed in the chip rack 90. However, circuitry 156 may be included in the chip rack 90 and the connector 96 may act as the input/output of the decoding circuitry 156 for transmitting information between a central computer and the decoding circuitry 156, or an additional connector 97 may be used. Although not shown, a single set of decoding circuitry 156 may be coupled to a plurality of columns of chip racks 90.

The decoding circuitry 156 includes a valid number decode circuit 160, a processor 162 (e.g. memory and logic circuitry, microprocessor, computer, etc.), a send modem 164 and a receive modem 166. The valid number decode circuitry 160 determines the lowest possible number for the binary number as read by the photosensitive devices 93 and circuit 154, and hence the valid code number. The valid code numbers are then provided to the processor 162 which stores and/or processes them. Regardless of what information is on the chip edge, the photosensitive devices 93 will react thereto so that they provide via the amplifier and threshold circuitry 154 binary information to the valid number decoder 160 through connector 96.

The valid number decoder circuit 160 takes the binary information received, and determines the lowest possible binary number which that information can represent, as described above in connection with Tables I, II, III and FIGS. 1-3 and the decoding portions of FIGS. 4-5. Digital circuitry for carrying out the required processes as described are well known to those of skill in the art. A microprocessor 162, for example, can accomplish the shifting and comparisons, etc., and/or look-up table routines or algebraic expressions may be employed, etc., use of which are known to those of skill in the art.

The processor 162 may simply store the information provided by the valid number decoder 160 or can process information mation provided by the valid number decoder 160. For example, the processor 162 may send stored information to the central computer via the send modem 164 as initiated either by the processor 162 or the central computer. Alternatively, the processor 162 may provide information to the central computer only after there has been a change in the information provided to the processor 162. For example, the chips disposed in the rack 90 are continuously read, and if no chips are inserted or removed from the rack, then there is no change to the information provided to the processor 162. In such a case, no information will be sent to the central computer. However, if a chip is inserted or removed, the changed information received by the processor 162 could initiate a data transfer from Processor 162 to the central computer. The processor 162 may also be programmed to require more than one reading of each chip before recording the number provided by valid number decoder 160. This would eliminate transient readings which may occur when for example, a chip is in the process of being inserted or removed.

Modems 164,166 and processor 162, e.g., a microprocessor or microcomputer and programming therefor, are known for carrying out the functions described above.

Chip Alignment And Code Element Boundaries

If no structure or other provision is provided to orient the peripheral edges of the chips relative to the chip rack, it is possible for photosensitive devices 93 in the embodiment of FIG. 17 to be disposed at a boundary 170 between adjacent code elements 45a,45b. Such a situation may introduce a threshold problem, e.g., photosensitive devices 93 would neither be fully off nor fully on. Therefore, the amplifier and threshold circuitry 154 may not be able to determine with certainty whether the sensor lies adjacent a black or white code element. To detect the presence of a threshold problem, the readings of a number of photosensitive devices 93 for the same chip can be compared to see if one or more of the readings are generally in a threshold area. If so, multiple readings can then be taken from each photosensitive device, one biased above and one below the threshold level. The biased and unbiased information obtained from each photosensitive device can be processed to determine the specific coded pattern in this analog solution to the threshold problem. For example, amplifier and threshold circuitry 154 provides internally of block 154, a 0 volt final output for a black code element 45a and a 5 volt final output for a white code element 45b, and a proportional output for a boundary condition 170, i.e., 2.5 volt for 50% black and 50% white. To provide such linear readings internally, amplifier and threshold circuit 154 may contain non-linear amplifiers to linearize the output of the photosensitive devices. However, the outputs of the amplifier and threshold circuitry are 0 or 5 volts as a result of internal processing using an intermediate voltage, e.g., 2.5 volts, as a threshold. Three readings of each photosensitive device may be taken, one unbiased, one biased by +1.25 volts and the third biased by −1.25 volts. If a photosensitive device 93 is at a boundary 170, the biased readings from that photosensitive device will not logically match; i.e., they will be on opposite sides of the threshold (e.g., one biased reading will be 1.25 volts above the 2.5 volt threshold and the other 1.25 volts below the 2.5 volt threshold). From this, it can be deduced that a boundary condition 170 is present and that all photosensitive devices 93 are at boundaries 170 between code elements, albeit that some boundries may be between like code elements and some boundries may be between unlike code elements. (In FIG. 17, no boundry condition exists.) Where the biased and unbiased outputs of a photosensitive device are on the same side of the threshold (e.g., 6.25 volts and 3.75 volts), then it can be deduced that the boundry 170 read by the photosensitive device is between two identical code elements. At least two identical code elements would be adjacent each other on all chips with valid numbers (except if an even number of code elements is used one chip could have all code elements coded alternately with opposite logic levels). Other than this one exception, at least two identically code elements are adjacent each other on every chip. For example, black, black, white, . . . coded on a chip can readily be deduced since the black, black boundary condition can readily be identified and therefore the boundary 170 (between black and white) adjacent to it can be identified as going from black to white.

Summarizing, three readings (readings one and three being biased) are compared to a threshold reference, and when readings one and three are on opposite sides of the threshold reference for one or more of the photosensitive devices, it is concluded that a boundary condition exists. When readings one and three are on opposite sides of the threshold for all photosensitive devices, then the code elements are alternately of opposite logic levels (since there is no reference for the code, it doesn't matter where the code begins). Where the first and third readings are on opposite sides of the threshold for less than all of the photosensitive devices, then it is concluded from the output of any given photosensitive device that has first and third biased readings on the same side of the threshold that these readings accurately reflect that the photosensitive devices are at or near a boundary created by two code elements of the same logic level. Further, when the output of a given photosensitive device is on different sides of the threshold for the first and third biased readings, it can be concluded that this difference is a result of the boundary created by two opposite logic levels, and the code elements for the opposite logic levels may be referenced to a photosensitive device whose first and third biased readings are on the same side of the threshold to determine the nature of the code elements creating the boundary condition.

An alternative solution is to provide means for vibrating or tapping the chip rack so that the chips will periodically be moved slightly so that over a given time period the chips and sensors will be located so as to obtain a reading unaffected by boundary conditions. Also, it is possible to simply ignore specific code information from locations where the presence of a threshold problem is detected and utilize some general and quite helpful information which can nevertheless be obtained, e.g., the presence of a chip can be detected (for counting) and its denomination value may be determined from adjacent chip denominations. Detecting the presence of chips is described below.

Figure 18:
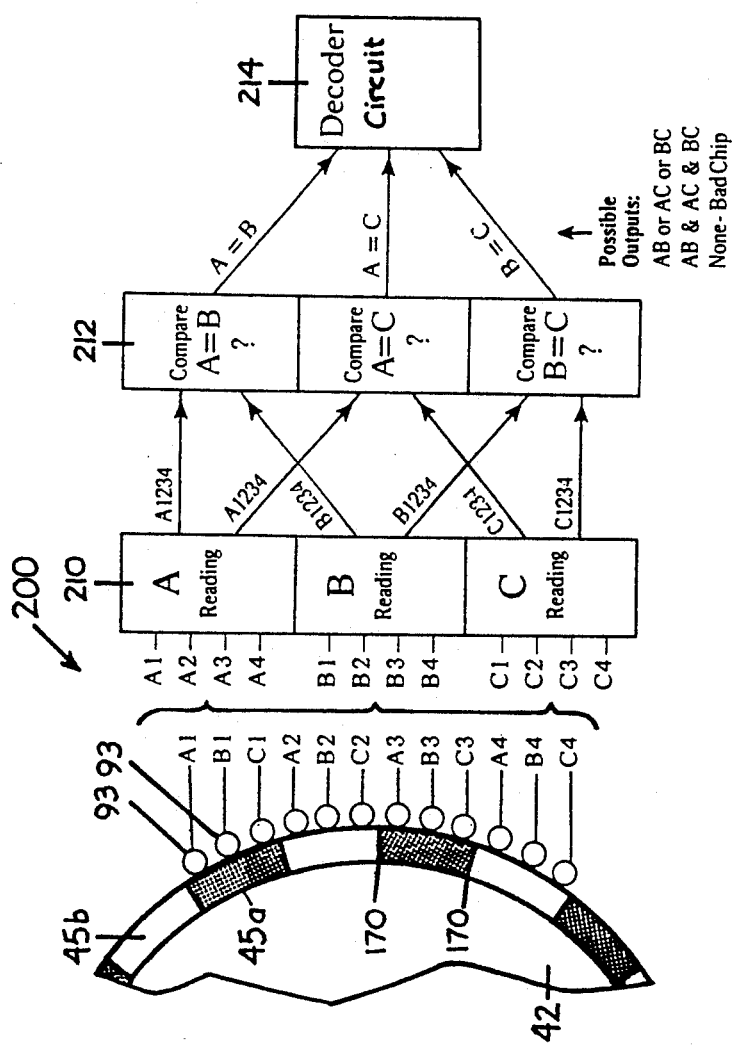
FIG. 18 is a schematic and block diagram representation of reading apparatus including another embodiment of optical sensors and decoding circuitry therefor.

FIG. 18 illustrates a pure digital solution to the threshold problem. Reading apparatus 200 reads from the code elements 45a, 45b on chip 42 properly, even when some of the photosensitive devices 93 are located at a boundary 170 between adjacent code elements. Reading apparatus 200 is provided with three sensor sets, sensor set A, sensor set B and sensor set C. Each set of sensors shown in FIG. 18 is comprised of four discrete photosensitive sensor elements, sensor elements A1, A2, A3 and A4 comprising sensor set A, sensor elements 81, 82, B3 and B4 comprising sensor set B and sensor elements C1, C2, C3 and C4 comprising sensor set C. Sensor sets may be activated simultaneously or sequentially and the individual sensor elements of each sensor set may be activated simultaneously or sequentially as a particular set of sensor elements is sampled. If the readings from sensor set A match the readings from sensor set B, or if the readings from sensor set A match the readings from sensor set C, or if the readings from sensor set B match the readings from sensor set C, then a reliable reading has been obtained because the boundary 170 between code elements 45a,45b can only fall on one of the sensor sets, A, B or C. Accordingly, at least two of the three individual sensor set readings, A and B or B and C, or A and C, will not be affected by the boundary threshold problem. Readings from a given sensor set may be offset by one when compared to another given sensor set because, as can be seen in FIG. 18, for example, the readings from sensor element A2 may equal that from sensor element C2 or from sensor C1; therefore, sensor set A may be offset to sensor set C by one.

By simply making comparisons of the three readings for each code element, i.e., $A_n$ to $B_n$, $B_n$ to $C_n$, and $A_n$ to $C_n$, an accurate reading of code elements may be obtained in this digital solution. The possible results of the comparisons are predictable. $A_n$ may equal $B_n$, and $B_n$ may equal $C_n$, and $A_n$ may equal $C_n$. If this is the result of the three comparisons, all readings are good and further, a threshold problem was not encountered. Another result of the comparisons could be that $A_n$ is equal to $C_n$ only, or $B_n$ is equal to $C_n$ only, or $A_n$ is equal to $B_n$ only. One of the readings, $A_n$ or $B_n$ or $C_n$ (only one) encountered the threshold problem. For example, if $B_n$ equals $C_n$ but $A_n$ equals neither $B_n$ or $C_n$, readings $A_n$, have encountered the threshold problem and are discarded, and readings $B_n$ or $C_n$ (or both $B_n$ and $C_n$) are passed along. A third possibility also exists: no equality between $A_n$, $B_n$ and $C_n$ readings. This chip is either damaged (by dirt, etc.) or a counterfeit etc.; such chips are called "bad reading chips", and will be removed from play, by a pit boss, for example.

Circuit 210 obtains and assembles the readings from the individual sensors and transmits them to comparison circuit 212 which carries out the comparisons described above. Decoder circuit 214 receives the binary information read from the chip 42 which is free from any boundary condition readings or problems and proceeds to decode the binary information as described for circuit 160 in FIG. 17. Construction and operation of circuits 210,212 and 214 are known to those of skill in the art. If desired, circuits 210, 212 and 214 may be embodied in a microcomputer or microprocessor programmed by one of skill in the art to carry out the above functions.

Circuits 210, 212 and 214 may be located in the chip rack 90, or off the chip rack 90 and coupled thereto by a connector such as 96.

Figure 19:
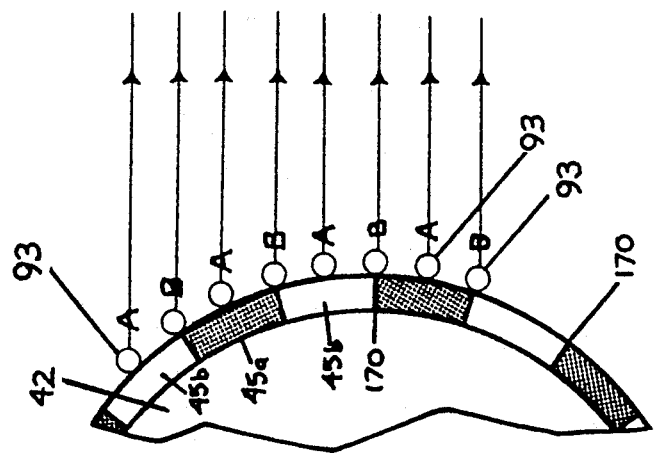
FIG. 19 is a schematic diagram of reading apparatus including still another, embodiment of optical sensors.

A hybrid solution to the threshold problem uses two sets of sensors, sets A and B, with the sensor elements deployed as shown in FIG. 19. Only one sensor set can be presented with a boundary condition at any time. If either sensor set A or sensor set B provides one or more boundary readings, it (they) may be ignored and the readings from the other sensor set used since both sensor sets cannot be at the boundary at the same time. Alternatively, the readings from the sensor set affected by the boundary condition(s) may be referenced, as in the analog solution above for FIG. 17, or referenced to the sensor set with the non-boundary condition readings. for further confirmation of the good readings. If the readings from both sensor sets A and are equal or offset by one, then neither is located at a boundary and the two readings may be used to confirm the result. The hybrid solution described above requires one digital decision about an analog condition but for other purposes is essentially digital.

It is possible to avoid threshold problems by the use of non-round casino chips, e.g., polygons, "scalloped" polygons, stars, ovals, etc. Such shapes will align the chips in correspondingly shaped chip racks naturally so that the sensors do not lie at boundaries between coded elements. One solution, for example, is to provide a polygonal chip having a number of sides equal to the total number of code elements required (one side per code element). For polygonal chips having a number of sides less than the number of codable positions required, the total number of code elements is selected so that each polygonal side has an equal number of code elements and sensors are spaced in accordance with the spacing of the code elements. Code elements and correspondingly placed sensors need not be uniformly spaced as with round chips, within obvious limits. Code elements may also be provided at the vertices of the polygon and sensors correspondingly positioned.

The positioning and number of code elements for certain shape chips will depend upon the particular shape chosen. For example, if more than one code element is put on one side of a polygonal shaped chip, more valid codes could be used for the same number of code elements. Consider a simplistic example of a pentagon shaped chip coded once with a code of 15 code elements which are deployed so that 3 code elements appear on each side of the chips and wherein chips are not flipped. Five startinq points are possible given a chip rack that accommodates the pentagon shape of the chip. Now, when generating valid codes or decoding information read from a chip etc., the advantage of working in octal can be taken since the 3 (binary) code elements on each side form binary coded octal numbers. Consider an arbitrary code in accord with the pentagon shaped example above (hyphens represent the five vertices): 001-010-011-100-101-, or, in octal, 1-2-3-4-5-. This can be conveniently read five different ways in octal: 1-2-3-4-5- and 2-3-4-5-1-2- and 3-4-5-1-2- and 4-5-1-2-3- and 5-1-2-3-4-. Decoding may be performed in octal, etc.

Error Detection

The coding/decoding system disclosed herein has inherent error detection and correction capability with respect to gambling chips. For example, a set of coded elements is repeated three times, and although only a third of the code elements need be read when the chip is in a chip rack all of the code elements are available to be read when a chip is removed from the rack at the gaming table. Therefore, when an abnormality is detected in coded information read from a chip in a chip rack at a gaming table, the chip may be removed from the chip rack and presented to reading apparatus which reads all three sets of the code elements, and the readings from all three sets of corresponding code elements compared, etc. If corresponding readings for the three sets are the same, the chip is a counterfeit or belongs to another casino, etc. If the corresponding readings differ, then one or more of the code elements may have been damaged, etc., and the chip is not necessarily a counterfeit, etc. No matter what the reason, bad reading chips will be removed from play as soon as possible for comprehensive analysis and resulting determination that will be helpful to casino management, and such chips cleaned or repaired, passers of counterfeit chips apprehended, etc.

Chip Counting Without Reading Codes

The embodiments of the invention described above involve gambling chips having machine-readable coded information, machine-reading of the information from the chips and uses of such information. However, it is possible in accordance with the invention to obtain useful information relating to gambling chips without the need to read specific coded information from the chips. For example, detecting the presence of gambling chips in a chip rack located, for example, at a gambling table can enable chips to be counted in real time without interrupting or interferring with gambling. Counting chips not only can provide a total chip count, but also can provide chip counts by denomination which would enable cash flow at the gambling tables to be monitored. As mentioned, the chips may be identical to those now in use and need not include any additional visible or machine readable indicia or coded information, or may include such indicia or coded information.

Figure 20:
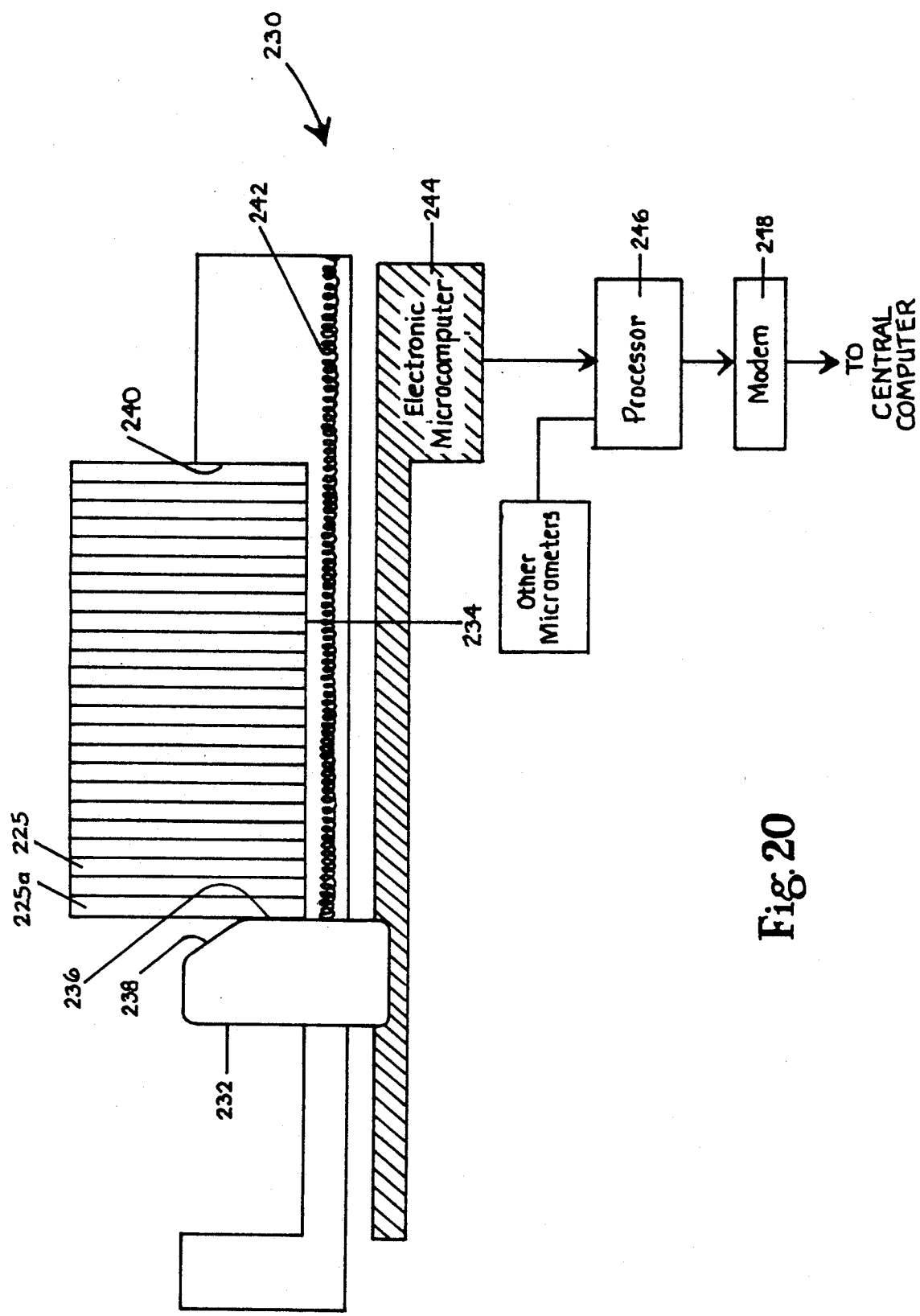
FIG. 20 is a schematic diagram of a chip rack including apparatus for radially aligning chips and for determining the number of chips in the rack.

FIG. 20 depicts one embodiment of apparatus which counts chips 225 without a code by detecting the presence of the chips in a chip rack. The chip rack 230 depicted in FIG. 20 includes a movable part such as a slide 232 disposed to move axially of each channel 234 which receives and holds chips 225 in a column or stack. The slide 232 includes an end 236 having a flat surface, for example, for contacting the end chip 225a and a tapered part 238 which acts as a camming surface to facilitate the insertion and removing of chips from the rack. The slide 232 is resiliently urged towards one end 240 of the channel 234 by a spring 242. This also maintains axial alignment of the chips in the channel and prevents skewing of chips in the channel. When chips are removed from or inserted in the rack 230, the slide 232 moves appropriately under the influence of spring 242 so it contacts the first chip 225a in the channel. The slide 232 may be coupled to a measuring device 244, for example, which measures the distance the slide extends into the rack from end reference position 240. This distance is proportional to the number of chips in the channel. The total number of chips in the channel is, for example, determined simply by dividing the distance the slide extends into the channel by a reference number proportional to the thickness of a chip. The measuring device 244 is depicted schematically in FIG. 20 as an electronic micrometer which is known in the art and in which spring biased slide 232 replaces the jaw of the conventional micrometer. Information relating to the distance of slide 232 from end 240 is supplied to a processor 246 which provides information related to the number of chips in channel 234. Processor 246 may include memory for storing the information for display at the chip rack on a display (e.g., an LCD), and/or it may supply said information to modem 248 for transmission to a central computer. A single processor 246 may be coupled to all micrometers 244 for the chip channels of a chip rack, or to all micrometers for a plurality of chip racks.

Chips may be counted by denomination by referencing the micrometer devices to specific channels having specific denominations of chips, while ensuring that game operators insert the proper denomination of chips into the proper chip channels.

Another embodiment of chip counting apparatus may include a chip rack having a discrete location (e.g., groove) for each chip (see FIG. 14, for example), and an individual presence detector associated with each chip location. The presence detectors may comprise one or more light emitters such as LED's which may emit visible or invisible light, and a light sensitive device (93 in FIG. 14) (e.g., a phototransistor) disposed along the optical axis of the light emitter and spaced so that a chip may be inserted between the two. For example, a light emitter and a light sensitive device could be disposed in each groove of the chip rack spaced by 120°, for example, and aligned so that the optical axis of the light emitter intersects the active area of the light sensitive device. Alternatively, a light sensitive device can be disposed in the channel for receiving ambient light which would be blocked when a chip is disposed in the respective location or groove. The individual light sensitive devices are coupled to a processor (e.g., microprocessor) to provide the processor with presence and absence information from which the processor computes the number of chips in each rack. For example, if the location of the "top" or "end" chip in a column is known, the number of chips adjacent the top or end chip can be readily determined. Multiple racks may be coupled to a single processor which via a modem can transmit the information to a central computer.

Chip counting as described above offers real time data-gathering capability while a game is in play, and, with subsequent processing of the data, further offers real-time financial and/or other analysis. This chip counting approach requires no special chip form or any changes to existing gambling chips.

A chip management system that detects only the presence and absence of chips as described above has many of the same requirements as a system which utilizes individually coded chips in that processing equipment and a central computer are required as well as cabling and modems interconnecting them. Therefore, a system employing coded chips is preferred because of the additional capabilities it provides.

Chip Management Systems

Figure 21:
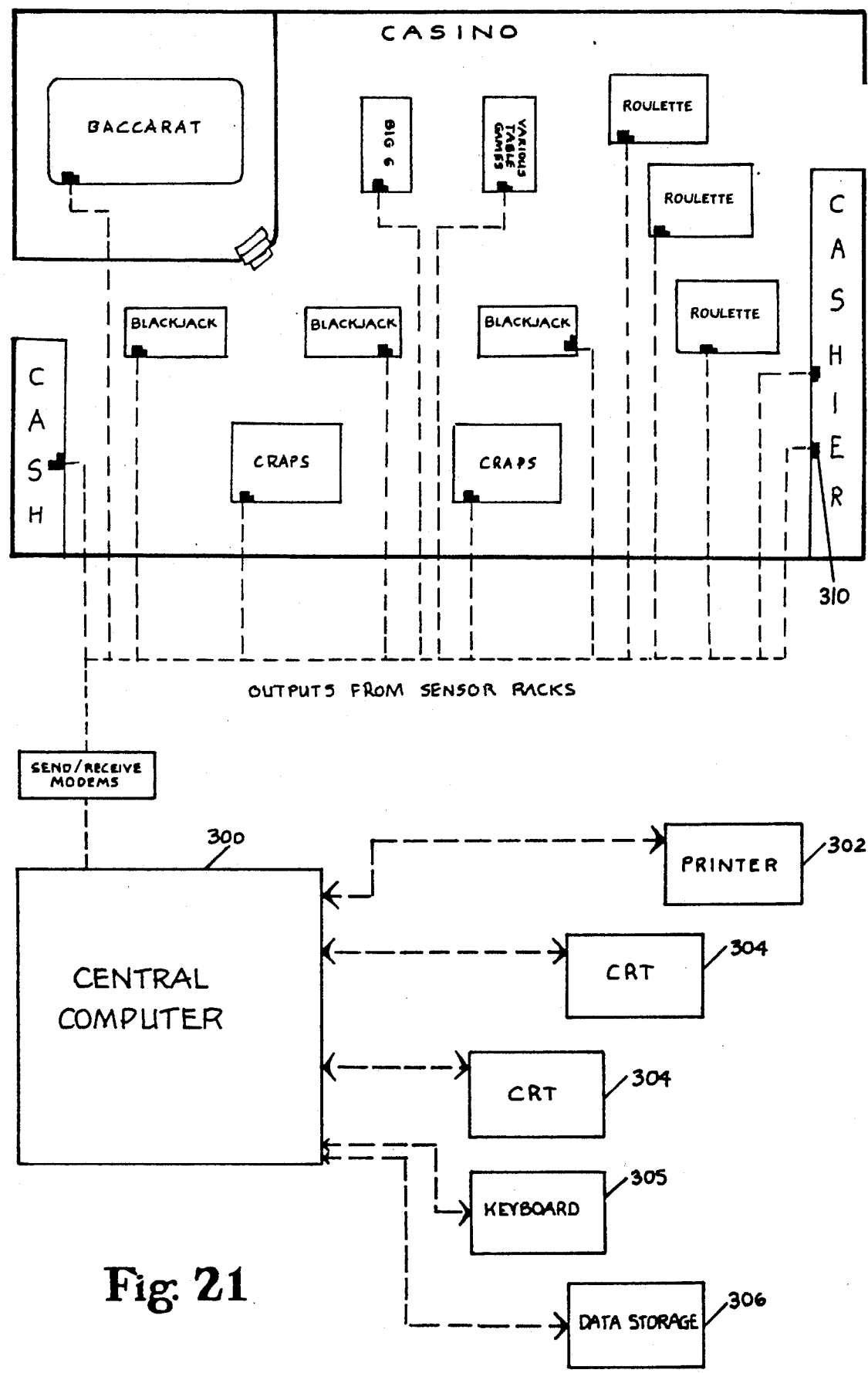
FIG. 21 is a block diagram of a system for managing chips in a casino.

Referring to FIG. 21, the electronics located at the gambling table chip racks (see FIG. 17) provides information to a central computer 300 which may perform a number of functions including determining whether any chips read are counterfeit, totaling chips, etc. It is also possible for the central computer 300 to keep track of or to trace each chip as it is removed and inserted in chip racks at different locations (or determine that it is not returned to any location) since all the gambling tables are coupled to central computer 300. Central computer 300 can identify each and every chip location in the casino and also can identify the precise location of any chip in the casino. The electronics at the chip racks (remote locations) also includes a receive modem 166 (FIG. 17) for receiving information from central computer 300 which can be displayed as described above in connection with FIG. 14 to identify chip locations, or to provide other information.

Chip racks at each of the gambling tables are coupled to central computer 300 via modems or interfaces at the tables and/or at the central computer. If desired, the computer can be coupled to displays such as printer 302 and CRT's 304 to display processed data relating to the chips and for use in management of the casino. Such data is available in appropriate form instantaneously to casino management constantly. Thus, the system of FIGS. 21, 17 and 14 can accomplish some of the following and other chip management and casino operation functions: count chips; detect counterfeit or damaged chips; determine the number of chips available for play at any time on a table or casino wide basis; keep track of specific player's chips or game operators, etc. With cash receipt information entered, it analyzes cash flow, losses and profits, etc., at a given time on a table or casino wide basis, etc.

A special "counting rack" 310 can be provided for counting "loose" chips which can automatically convey chip counts to central computer 300. A mechanical sorting device (not shown) (such devices are well known for use with a variety of coins, etc.) may be used to separate different denominations of chips. A computer, (not shown) reading coded information from the chips being sorted, could be used to control the sorting device and provide information to central computer 300.

A "transport rack" (not shown) may be provided for transporting chips to and from gaming tables, cashier booths, etc. The transport rack will have a quick disconnect connector 96 as described above and a "locking" mechanism which locks the chips in the transport rack when it is disconnected. When the transport rack arrives at the designated location, it is reconnected in receptacles provided thereat at which time it will be unlocked and the chips can be removed and placed appropriately at the new location in racks or other storage facilities. The transport rack may also provide information directly to central computer 300 when it is connected at the new location.

Other possibilities exist such as using machines which read coded chips to cash them for customers, thereby replacing human tellers. This eliminates the stringent current requirements to insure chips are not "lost" in the transactions. Obviously, counterfeit chips would not be paid. Also, machines which automatically dispense chips could be be provided.

Accuracy in payment of a winning bet could be confirmed, automatically, with mini-racks provided for players bets, i.e., when a player placed a bet at blackjack, for example, he would place the chips he is wagering in a "betting" rack fixed at the table. Such racks would be similar to rack 90 in FIG. 14, but may not need the indicators 95. Payment from winning bets would be placed in the same rack. Naturally, chips placed in the betting rack could be read in fractions of a second. Individual sensing racks could also be provided for players to keep their chips in while they are gambling at the gaming tables.

In any case, up-to-the-minute accounting information is always available to casino management from the central computer 300. Also, the system may be made interactive by means of keyboard 305, and information and requests for information can be entered into the central computer via keyboard 305 and data storage 306. The central computer may also be made interactive with security and/or surveillance equipment.

Cashiers, dealers and/or pit bosses may also enter any exchange of money and chips into the central computer 300. For example, when a blackjack player gives the dealer $100 and asks for chips, the dealer drops the cash (or marker, etc.) into the cash box, gives the chips to the player, and the dealer or the pit boss enters by means of a keyboard, money scanner, voice recognition unit, etc., information indicating that $100 was received to record the transaction, along with the players name, when appropriate. If the dealer paid more than $100 in chips, central computer 300 would detect this "error". The extra step of entering this information would literally take only a couple of seconds, if that. Cashiers would similarly record transactions or this can be done automatically by chip cashing machines.

Other options exist as alternate means to enter the exchange of money (or markers, etc.) for chips at gambling tables and cashier booths. Special purpose chips could be used by dealers, etc., in a variety of ways to inform the central computer of these transactions, or a dealer (cashier etc.) operated foot switch can be provided. Such a device can help in a variety of tasks. For example, in association with a foot switch being actuated, the dealer would remove chips from his rack to "sell" to a player. This would inform the computer of the amount of money (markers, etc.) that should have been deposited in the cash box associated with each gaming table.

While not necessary, it may be beneficial to send other information to the central computer from chip racks. For example, a dealer could enter his ID number when he starts a shift or takes over for another dealer, and when he finishes a shift, etc. Preferably, this is accomplished with a special "ID chip" uniquely coded to identify each employee. This chip could be colored differently than a playing chip.

Special chips could be used for a variety of purposes. A special single chip slot could be provided or any normal chip location may suffice to read special chips. If a special slot is used, provision could be made for one chip to serve one purpose right side up and another purpose up side down. If no special slot is provided, then, if a special chip is put in the right column of the rack, it could mean that the dealer is just starting to deal and when put in the left column momentarily it could mean he just finished. Other columns could mean other things such as a call for a waitress, a break, more chips, a player is suspected of "counting" etc. If blackjack were made by a player at a blackjack table at which player's racks are being utilized, a special chip could be used to tell the computer, thereby keeping the winner's bets straight. A special chip could be used to indicate a "push" etc.

It would be useful to keep central computer 300 informed of the progress of a game. For example, in blackjack, the beginning of the hand could be indicated when a special chip is turned upside down and the finish indicated by turning the chip again. After this turn of the chip, central computer 300 would know that bets are being collected or paid. etc. Other means could be provided for this kind of thing: the first card dealt could automatically be sensed, for example. Or in craps, one of the dealers could keep the computer informed,, etc.

Also, coded chips would readily support robotic dealers. Another use for "special chips" in a casino/hotel might be to use them for room keys, etc.

Apparatus For Encoding And Reading Chips

The manner in which coded information may be applied to the chips is not described in detail, as conventional optical, magnetic, magnetic storing, mechanical, electrical, etc., techniques may be used. For example, a rotary printing press may print optical code elements on chips, machines may cut slants or recesses into the edge of the chips, and machines may magnetize or metallize casino chips during or after construction, etc. Appropriate sensing devices may include a variety of components, scanners, etc.

In one embodiment, logical zero code elements may be made by sawing or filing or cutting a recess into the chip about 1/32 or 1/64 inch, while logical one code elements are not recessed and are metallized, for example, with gold. The logical zeros and ones can be detected electronically as discussed above by measuring the distance, or rather, comparing the distances of nearer metallized positions to farther non-metallized positions.

Only apparatus for reading coded information optically from chips has been described in detail. However, light is only one type of "wave" energy. Devices which emit and detect other forms of wave energy such as radio waves may be used. Assuming an emitter and detector of wave energy are used, other ways of imparting binary code elements on gambling chips may be used. For example, the "black" stripes could be recessed. This approach, in effect, requires measuring the distance from the chip rack sensor/emitter to the edge of the chip, for example, using radar techniques or capacitance distance measuring techniques known in the respective arts.

As to reading magnetically coded information, Hall effect tranducers in the chip rack may be used to detect a difference in ambient magnetism by the proximity of magnetic material in or on the chips, or, magnetic material may be put in the chip rack and metallic material or material with metallic properties used on the edge surface of the casino chip to be detected by the magnetic sensors in the chip rack. Alternatively, codes could be imparted in magnetic storage material such as is on the back of some credit cords, and read with appropriate reading apparatus, etc.

Coding Other Objects

The coding/decoding system described herein can be used to provide coded information on many objects other than gambling chips. The code elements may take various forms and be disposed for machine reading in various locations on various objects. Such objects may include household products, food and other products typically sold in supermarkets, drugstores, etc. The objects may include containers and wrappings for such products and may be disposed for machine reading from both flat and curved surfaces on what may be considered as the top, bottom, sides, edges, etc., of the objects. Also, machine-readable coded labels, tags, etc. may be attached to objects.

The coding/decoding system described may also be used for coding objects used on production lines, etc., wherein reading devices identify the objects by the coded information thereon. Different sides of these objects may be coded similarly or differently. For example, different sides may be coded with different information so that robotic-like or other apparatus could identify the object and the particular surface thereof, so that a particular orientation of the object may be accomplished for subsequent operations. Or the same side may be coded with two different codes, such as a pair of codes, for orientating a particular side of an object in one of two directions, etc.

Figure 22:
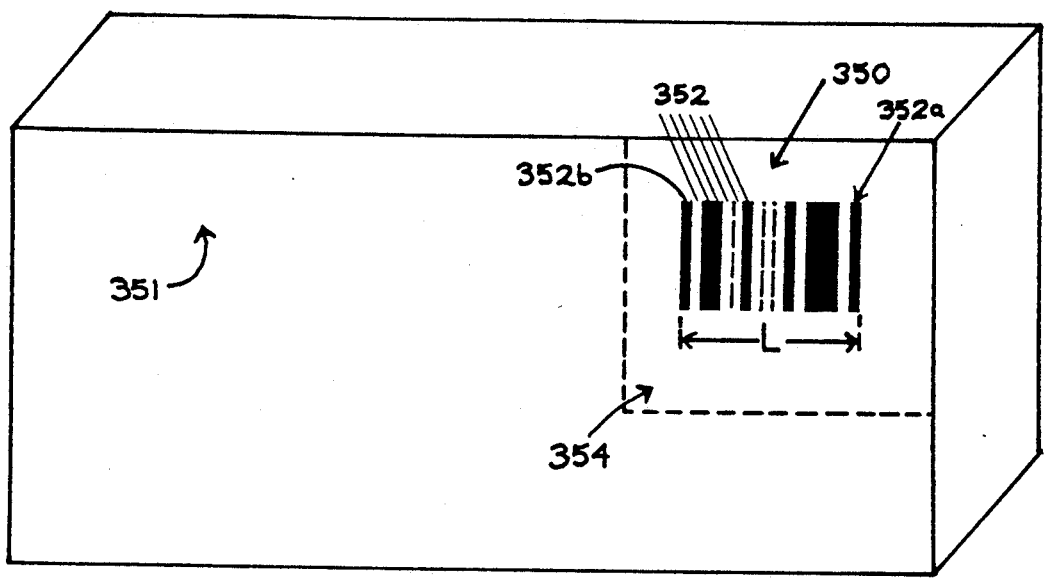
FIG. 22 is a schematic diagram of an object having coded information thereon extending linearly along a line which may serve, for example, as a UPC code.

The code formats for a variety of objects may be the same as or similar to those depicted in FIGS. 8 and 10-13 with the size of the individual code elements being selected in accordance with the particular application. Also, the individual code elements need not necessarily extend as a group in a closed loop as in FIGS. 8, 10, 11 and 12, and an individual code element itself need not extend in a linear stripe or strip as in FIGS. 8, 10, 11, and 12 or in a circle as in FIG. 13. For example, the format of a single layer of code elements similar to those of FIGS. 8 and 10-13 is depicted in FIG. 22 on the top of a rectangular prismatic package which may contain almost any type of object or objects such as a bar of soap, food, etc. Code 350 on object 351 in FIG. 22 resembles the product code now associated with almost all supermarket products, such a product code being know as "universal product code" (UPC). Code 350 is essentially identical to any portion of the code depicted in FIG. 13. The individual code elements 352 of code 350 extend along a line, which in the embodiment of FIG. 22 is a straight line. However, the code elements could extend along a curved line if desired or if necessary in a line following the contours of a particular object. The coding/decoding system disclosed herein provides improvements over existing UPC systems and facilitates product coding in areas including one or more of the following: resolution requirements; reliability of reading; the number of products uniquely codable in relation to the number of codable positions available; speed of reading; angles of reading; simplicity; etc.

Coded information may be located almost anywhere on different objects, unlike a gambling chip where the code elements are read from the chip periphery. With reference to gambling chip 80 of FIG. 13, the coding may be read starting from either the top or bottom edge of the periphery, depending on which way the chip is flipped as described above. The first and last code elements (and all elements in between) are therefore in fixed locations of the chip periphery allowing use of reading means that would always be "registered" to the code elements. In order to identify the location of the first and last code elements of a code which employs the absence of a characteristic as a logic level (e.g., a black and white optical code on a white background where the absence of black denotes a logic level) on objects where the code is not sufficiently registered to an edge, etc. of the object, the first and last code elements 352a, 352b (FIG. 22) may always be coded (optically) with the applied (i.e. black) contrasting characteristic. In some applications, only 352a or 352b may need to be black. And, in some applications it may be preferred to make the end element(s) 352a and/or 352b proportionally different in vertical (height or longitudinal) extent, when compared to other black code elements.

With the end code elements 352a, 352b optically coded black, reading, decoding, etc., may proceed as described for the gambling chips of FIG. 13 once either of the end code elements 352a, 352b is located by the reading means. Either end coded position 352a, 352b may be used as the starting point (reference) for code 350 since the coded information can be read from one end or the other and either reading is considered equivalent to the other reading. In this example, reading, decoding, etc., may proceed as described above in connection with two-way readable codes on gambling chips 80 of FIG. 13. This allows a clerk, for example, to hold the object right side up or upside down when exposing the object to reading means, as at an automated check-out counter in a supermarket.

A plurality of objects 351 are encoded with a plurality of codes 350 associated with a predetermined portion 354 of the objects. The code number 350 has a plurality of code elements 352 each defined by one of two machine readable contrasting properties, in this case black or white. The black contrasting properties are applied to the predetermined portion 354 in a desired pattern. The predetermined white area of the object defines the other of the two properties. In other words, a portion of the predetermined white portion 354 forms the other of the contrasting properties to which the contrasting property is applied. The resulting pattern of black and white properties between 352a and 352b, inclusive, defines discrete areas of the predetermined area 354, each with one or the other of the contrasting properties. Each of the discrete areas is divisible by a single code element and the first and last discrete areas 352a and 352b in the resulting pattern are of the black contrasting property and are at least one code element wide. Indeed, the first and last discrete areas 352a and 352b may be viewed as part of the code. And using the two opposing end elements 352a and 352b as described, and no (other) discrimination as described below, the yield of valid code numbers for N code elements is 2 raised to the power of (N−2), wherein effectively only odd numbers are used in the second half of the possible series, zero through 2 raised to the power of N, less 1, inclusive.

The overall length L of the code 350 may be defined by the distance between the outside edges (the edges away from the center of the code) of code elements 352a and 352b, as shown in FIG. 22, and thus L may be readily determined by reading and processing means. Therefore, given the number of code elements N, the exact width W of each code element is: L divided by N. The width of each code element, W, may be used by reading and processing means in analyzing the nature (black or white) of each code element and this method allows for variances in L to occur, as well as variances in the reading means, while still allowing the code 350 to be read accurately. Of course, the length of L and/or the width of a single code element may be a given in any particular application.

Another method may be used to determine the width of each code element. This method may be used in conjunction with or it may be used without the method of effectively dividing L by N just described. It falls into a broad catagory of coding methodology that may be called "discrimination". Discrimination, essentially, is non-use of certain code patterns that are possible for a given N. (The disadvantage of discrimination is that fewer objects can be coded for a given number of code elements.)

Here, for example, all coding patterns can be discriminated against that do not contain at least one single code element which is bounded on both immediately adjacent sides by code elements containing the opposite contrasting property. A single black and/or a single white code element is thus required to be present in the codes, or a single code element is required in the first half and/or the remaining half of the codes, etc. The point here is that if all the codes used contain at least one "isolated" code element of one logic level bounded on both side by the opposite logic level, e.g., a black element with white elements on both sides (and this isolated code element is deployed in a predetermined manner in accordance with a particular coding application), the width of a single code element can be determined as the narrowest contrasting property read. Alternatively, the width W of a code element may be given. In either case, it may not be necessary to predetermine N, the number of code elements, or, if N were predetermined, more than one way of determining the width of each element may be utilized, thereby realizing a higher degree of accuracy when reading and analysing the code. If N were not predetermined, then reading and processing apparatus could determine L, and divide L by W thereby determining N for a particular code.

Further, if only one end element is always black and N is predetermined, and either W is predetermined or the codes always contain an isolated code element as described above, L can be determined by multiplying N times W; this approach requires only one black end element. As can be seen, the coding/decoding principles disclosed herein may be utilized in a variety of ways to best cope with any given circumstances.

Code patterns of contrasting properties for the objects may discriminate against certain other codes, e.g., codes may exclude patterns having discrete areas larger than a predetermined number of code elements, as discussed more fully below.

Figure 22A:
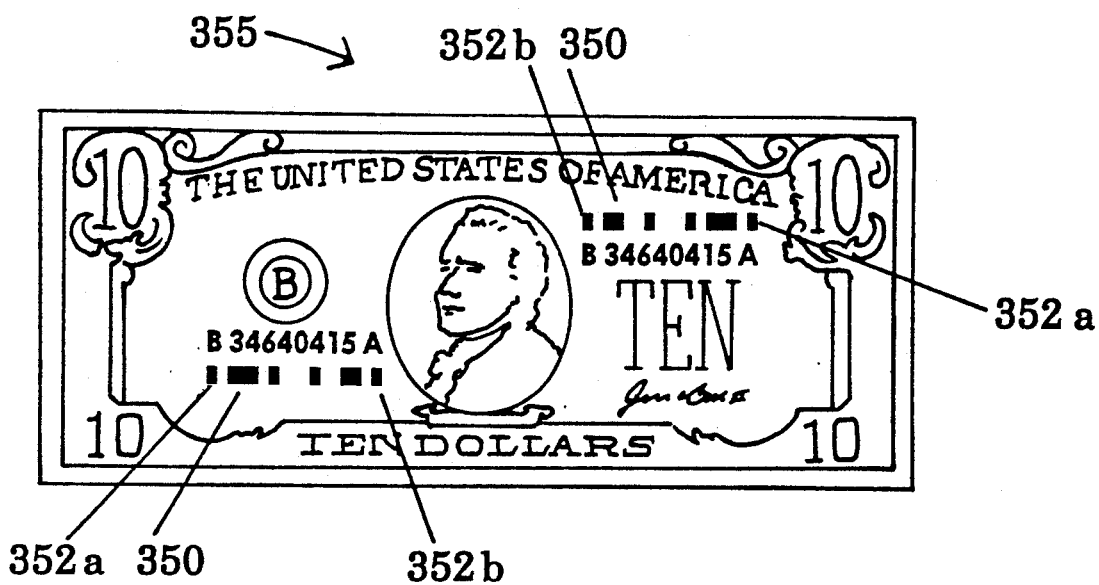
FIG. 22A is a black and white reproduction, ¾ size, of a U.S. $10 bill encoded with the same coded information as in FIG. 22.

Another possible application for code 350 is machine-readable coding for paper currency, commercial paper, checks, etc. (To machine read currency, the bills may be presented to reading apparatus in a stack, and means are provided to separate the bills, or to partially separate the bills, for reading.) The end code elements 352a, 352b may be used to define the extent of the full code L in a one-way reading environment. With respect to paper currency 355 as shown in FIG. 22A, one-way reading only may suffice in that coding 350 could be printed, embossed etc. in more than one location on the currency bill in such a manner that no matter what the orientation of the bill in a stack of bills, the coding would be the same when read by one-way reading, scanning, etc. apparatus. For example, coding could be printed on the upper right, lower left, front and back portions of the bill with the same end of the code 350 facing the outside of the bill as partially shown in FIG. 22A. Alternatively, if the bills were read when stacked face up and right side up, one code only need be put in one predetermined area, or, if the bills were always read face up but could be either right side up or upside down, only two codes need be put on the face of the bill and other variations are possible using the two-way code in a manner described for FIG. 22. However, an advantage to repeating the code, as with gambling chips, is that a damaged etc., bill may be more thoroughly examined to extract the coded information. Any codes thus printed would be read the same by a given one-way reading apparatus. With a given number of code elements, N, of equal extent lying between end code elements 352a, 352b, (thus defining L), and/or with an isolated code element as described above, reading apparatus may readily interpret the full code accurately. The location of each code element could be readily identified even if the scanned image, representation, etc. of the full code were stretched or shrunk or scanned quickly or slowly etc., as described below. Additional forms of discrimination, as described below, may be employed as well.

In a one way reading application, as described, e.g., in connection with FIG. 22A above, if only two or all of the following three specifications were given: the width of a single code element, W; L; or N, either 352a or 352b will suffice, as mentioned above. Assume only 352a was used and it was used at the beginning of the code. Reading apparatus need only locate 352a, the first (black) code element, and once located reading could proceed and would thus be able to read all code elements accurately. However, tolerances for shrinkage, etc. would be (more) strict.

Heretofore, counterfeit currency has been coped with simply by making it more difficult to make a good copy. This is only a deterrent. The principles of positive counterfeit detection of casino chips as described may be directly applied to the government's counterfeit problem. To avoid detection, counterfeiters would be limited to passing counterfeits in locations that did not use identifying apparatus. Practically speaking, the amount of future counterfeiting would be inversely proportional to the proliferation of reading apparatus with real time processing ability for the identification of coded serial numbers. Also, the principles of casino chip tracing may be applied to tracing currency.

Thus coping with counterfeiting, applicants further suggest that there may be benefit in using a more durable medium instead of fast wearing paper, to save (frequent) re-printing and related expenses. Alternatively, just the coded area of the currency may be protected with appropriate coating, treatments, etc., to insure that the coded information would out-last the useful life of the currency and/or minimize the adverse effects of writing, dirt, etc., by making it difficult for foreign substance to adhere to the currency.

If the paper currency now in use were to be replaced with machine-readable coded currency, it could be accomplished slowly, i.e., as old money wore out, new money could be used to replace it. Other points should be considered simultaneously with the change to machine-readable coded currency, e.g., one major factor of normal wear and tear on currency is that, usually, when more than one bill is handled, bundled, etc., they are oriented face-to-back in a stack and all put right-side up. Much (or all) of this orienting of bills could be eliminated. The top half of the face could be indentical to the bottom half and each half coud be rotated 180 degrees with respect to the other so that bills would always be right-side up without effort when they were placed face to back (like a playing card from a deck of cards). The same may or may not be done on the back of the bills. Of course, the portraits would need to be placed on the top half and the bottom half of the bills and other adjustments would need to be made.

Less manual handling of currency means less wear and tear. But, another significant benefit would be realized. Less manual handling would save many manhours per year, considering both personal and commercial handling by toll booth attendants, clerks, cashiers, customers, etc., (and people kept waiting while currency is handled by others). Thus, considerable efficiencies and savings would be realized.

Also, the back could be made identical to the front thereby eliminating face to back orientating. This, however, makes it too easy for a person to fold one bill in a stack thereby counting one bill as two. Assuming the face and back of bills remain different, it may be worthwhile to decode the face of a bill (and this applies as well to other objects, such as production line components, for example) differently from the back so that automated bill counting, sorting, etc., apparatus could identify each particular surface for subsequent orientation of bills (or other objects) face to back automatically. Pairs of coded identifying information mentioned above may be useful here. For example, ignoring symmetrical codes and using two-way codes, as described above, in a one-way reading environment, the higher (of the forward and reverse order) may be used on the back and the lower on the front to thus inform processing apparatus which is the face of the bill. Or, for example, both readings may be put on the face of the bill in the following manner: coding 350 of FIG. 22A would be orientated the same way on both locations of the face of the $10 bill thus allowing orientation of the bills right side up. (Or four different sets of coded information could be used, etc.) After orientating the bill in a manner described, the lower of the readings, i.e., the decoded valid number, may be passed on for identifying, etc., in subsequent processing. Or "odd" codes could be used on the face and "even" codes on the back, etc.

Also, if coding were used on the face of the bill, the lack of coding itself may be sufficient information to orient the bill face to back.

Figure 23:
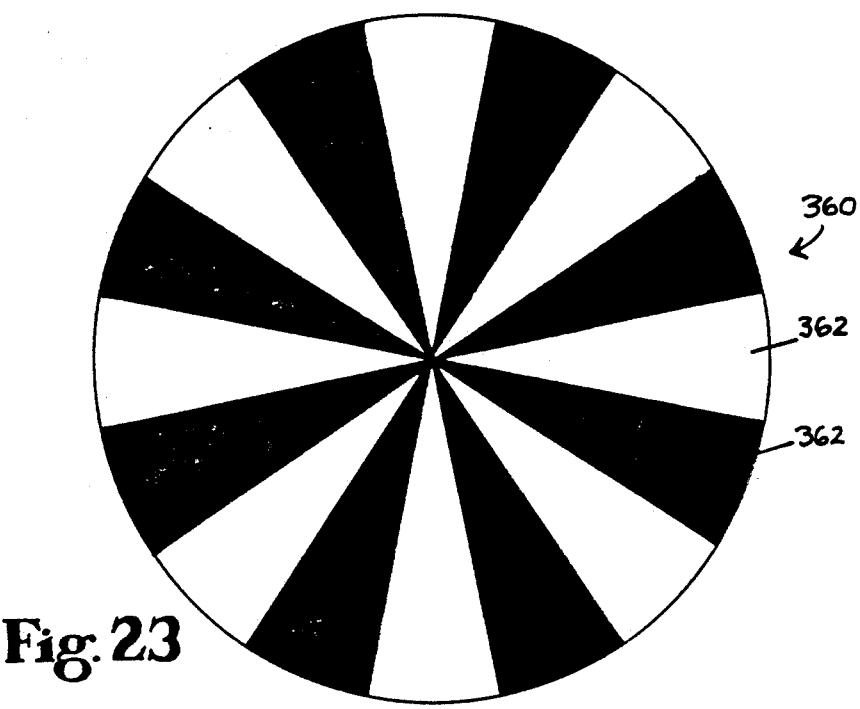
FIG. 23 is a plan view of coded information on a flat object.
Figure 24:
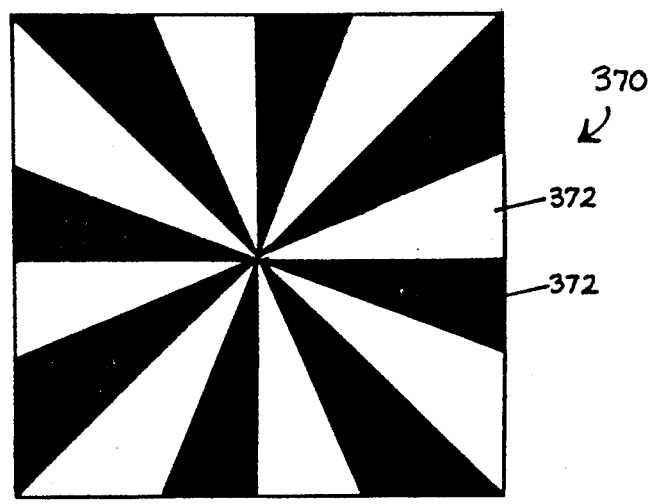
FIG. 24 is a plan view of coded information on a flat object according to an alternate embodiment.

A preferred code for grocery products, paper currency, etc., is the coding of FIG. 23 or 24, because no rotary orientation of the reading means to the code on the object is required. Reading may be simplified and/or errors may be reduced with most appropriate types of reading means, such as laser scanners. Because of their intrinsic operating methodology, such reading means may not encounter threshold problems as described for discrete sensors for casino chips above. And, although the coding described herein is not meant to be read by people, an optical code will be seen by them, and the coding of FIG. 23 and 24 is more aesthetically pleasing to the eye. The disadvantage of FIG. 23 and 24's coding compared to that of FIG. 22 and 22A is that several more code elements may be required to code a given number of objects, and decoding etc., may require a bit more processing, memory, etc.

Referring to FIGS. 23 and 24, codes 360 and 370 are depicted for use on objects as described generally in connection with FIGS. 22 and 22A. The code elements 362,372 of codes 360, 370, respectively, extend in closed loops. The outer periphery of code 360 is circular while that of code 370 is rectangular. Each of the code elements 362,372, unlike those depicted in FIGS. 8, 10-13 and 22 and 22A, is not rectangular but varies in width in accordance with distance from the center of the closed loop. Specifically, code elements 362,372 are wedge-shaped. Although shown to be continuous from the center of the closed loop to the outer periphery thereof, code elements 362, 372 may be truncated and start and-/or terminate elsewhere than at the center and/or outer periphery of the closed loop, and they do not have to be continuous but can be broken. Moreover, it is not necessary that the entire code element be scanned or read and only a portion of each of the code elements need be scanned or read.

For the specific codes 360, 370 depicted in FIGS. 23 and 24, respectively, 16 code elements or codable positions extending in a circular loop are provided without a specific reference or starting point. (In some applications, a reference may be used.) Object identification and subsequent processing of data therefrom as described for gambling chips, is established by reading the code clockwise or counterclockwise. This eliminates the necessity of considering forward and reverse orientations of the code elements, i.e., two-way readings. Or if such coding is used, for example, on a clear plastic tag attached to a product from which the code may be read from the front or the back of the tag, then forward and reverse readings would have to be considered as described for gambling chips that get flipped.

Coding and decoding and related tasks involving the binary code elements depicted in FIGS. 22, 22A, 23 and 24 where black code elements represent one logic level and white code elements the other, may proceed as described in connection with gambling chips. However, usage is simplified with other objects since constraints found in the use of gambling chips as a general matter are more severe than in the use of other objects such as supermarket products.

Other methods of discrimination may be beneficially used with the codes described herein. Use of a "parity check" with codes such as code 352, 360 and 370 of FIGS. 22 and 22A, 23 and 24, respectively, as well as for gambling chips, is possible, i.e., of the available codes, only those with an even or odd number of logical ones may be used. This allows a convenient and/or practical means of detecting errors. Further discrimination of some codes may be desirable. For example, use of more than, say arbitrarily, 7 consecutive logical ones (or zeros) may not be desirable for aesthetic reasons associated with gambling chips because, e.g., casino management may not want to use chips with big gaps in the coding of the periphery, etc. Or use of more than 7 of the same consecutive logic levels with a given reading apparatus may introduce more error than acceptable in a particular application. This is dependent on tolerances, etc. For example, if the tolerance, etc., involved in dividing a block of 7 of the same consecutive code elements by the width of a single code element, or otherwise differentiating code elements in a block of 7 of the same consecutive code elements, is acceptable, dividing or differentiating 8 or more similarly may not be acceptable. Such codes may therefore be excluded. Also, certain code discrimination may be dependent on other discrimination, e.g., if 7 logical ones are used in 7 consecutive codable positions, only less than 7 will be used elsewhere in the same code, or less than 7 logical zeros will be used elsewhere in the code, etc. Other types of discrimination may be used. Specifics may vary in accordance with specific embodiments. And of course, error correcting means, as well as other error detecting means, well known to those in the art, could be employed with the coding described herein.

It is preferred that the coding/decoding system of the invention utilize code elements of substantially equal size (regardless of the specific configuration of the code elements). Among other benefits, this simplifies reading and/or scanning apparatus, decoding, etc., which is particularly advantageous in UPC and other types of applications.

It should also be noted that a plurality of lines or layers of the linear codes as described above may be disposed adjacent each other in a stacked (with or without offset), generally parallel relationship to each other (one layer of code elements atop another layer). Such layers of codes are somewhat similar to the (two) layers described in relation to FIGS. 10 and 11, although in FIG. 10 the coded information in each of the two layers is the same except that one layer is upside-down in relation to the other layer, and in FIG. 10 one layer is used to provide a reference for the other layer. As many layers of code elements as needed are provided and the stacked layers of code elements together comprise the coded information.

For example, it may be advantageous in some applications to stack 8 layers of 8 code elements each, similar to a (small) checker board. Using the coding/decoding system as just described may be preferred for currency, for example, where many code elements (of relatively large lateral extent) may be required and it may be more convenient to utilize more vertical extent for two or more layers of code elements than enough lateral extent for all the code elements required. Here, one corner element may be black or two particular diagonally opposed corner elements may be black, etc., and the corner code elements(s) may serve similar purposes as the end code element(s) 352a and/or 352b of FIGS. 22 and 22A. A checker-board type of code, as described above, may be utilized for coding objects where no specific orientation of the coded information to the object is required, since any corner code element may be used as a reference for the code etc. Indeed, corners may also be located without black code elements in them, assuming there was a black code element in each of the four sides and/or other appropriate discrimination used. Such discrimination thus provided, the code may be referenced to any or all of the four corners, or a fabricated starting point, as described in association with FIG. 12, may be used (two dimensions being considered).

If all four corner code elements of the checker-board example above were always black code elements, and the code were oriented to a given side of an object, for example, to the face of a $10 bill, and a stack of said $10 bills were oriented face to back and right side up and presented to reading apparatus thus oriented, the yield of valid codes would be 2 raised to the power of 60, and all valid codes would be odd, etc., etc., assuming no other discrimination, as described above, were used.

Square code elements, as described above, may be preferred, although round, rounded, rectangular shapes or any shape may be used (as may any shape code element be used for all coding described herein). For example, using the illustrative checker-board example again, the total vertical extent of the code as read by reading apparatus (comprised of 8 layers as described) may be divided by 8 in processing apparatus in order to derive the information from the 64 code elements (8 layers being pre-determined). And a given predetermined proportional relationship (equal in the checker-board examples) between the lateral extent and the vertical extent of each code element may also be beneficially used in said processing apparatus, etc.

The principles used with one line of code elements as described, may be applied to vertical "columns" of code elements. For example, if four layers were used, where four code elements of each vertical column were one atop the other, each four element column may be viewed as hexadecimal for generating valid codes, decoding, etc. It is also possible to utilize circular elements as code elements. In such a case, apparatus may be provided which, for example, includes means describing a circle for use in analyzing coded information read from objects.

The coding/decoding system may also be utilized to encode decimal digits in a manner similar to UPC. However, it is preferred to encode the information in binary only since this is more efficient. With the description and appended claims herein, many ways of using the coding/decoding invention will be apparent to those skilled in the relevant art.

ENCODING SIGNALS

Figure 25:
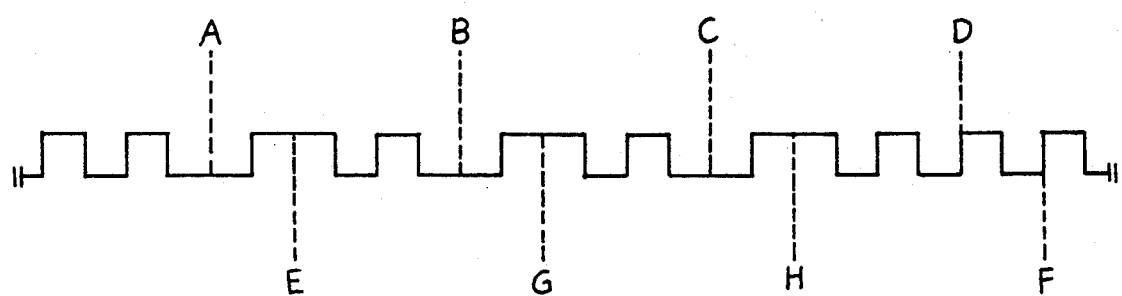
FIG. 25 is a wave diagram of a signal encoded with information according to the invention.

Referring to FIG. 25, a train of pulses representing information is depicted. The pulses could represent electrical current or voltage, wave energy, sonic energy, hydraulic energy, the signal in magnetic recording material, etc. The positive values represent logical ones and the negative or zero values represent logical zeros. The inventive coding/decoding system may transmit coded information by means of such pulses without a reference or starting point or reference to a specific time. Assume a code of six code elements. To code the information in the train of pulses, the set of six code elements constituting a complete set of coded information (obtained, for example, as described above, in connection with casino chips) is repeated three times for example, in sets AB, BC and CD. To decode, 18 consecutive pulses are compared in sets of six, and a set of six consecutive pulses is selected which set is repeated at least once in the 18 consecutive pulses considered. For example, assume that the 18 consecutive pulses are sampled starting at point E and ending at point F. When sets of six consecutive pulses are compared, it will be found that set EG is the same as set GH. If desired, the coded information can be repeated more than three times and the entire set of data or information repeated more than once so that even if reception commences in the middle of a particular set of data or information, all information can be obtained by receiving adjacent parts of two consecutive sets of data or information. The selected set, EG or GH, represents a complete set of coded information which is then decoded without a reference or starting point, as described in connection with one-way reading casino chips.

Means are known for encoding (e.g., binary) signals and are therefore not described.

Modifications And Other Embodiments

In some situations it may be desirable to print the coded or decoded information, or information corresponding thereto, in a normal decimal fashion or otherwise, on the face(s) of the gambling chips and other objects to allow people to readily read information therefrom. And further, it may be useful to print a reference on the face(s) of the chips and objects to reference the code elements (codable positions) of the code. And still further, apparatus may be provided to more fully examine, casino chips and/or the codable positions thereof so as to extract additional useful information from the chips or to read damaged chips etc., and the apparatus could be used away from the gaming tables to minimize any interference with the gambling games.

Certain changes and modifications of the embodiments of the invention disclosed herein will be readily apparent to those skilled in the arts. For example, the coding/decoding system may be used for alpha/numeric coding and used for information so encoded similar to coding/decoding systems such as ASCII currently in use. Moreover, to those in the various arts, the invention itself herein, will suggest solutions, etc., to other tasks, etc. Additionally, information coded and/or decoded with the coding/decoding system disclosed herein will find operating environments in various machinery such as mechanical, pneumatic, hydraulic, electronic. It is also possible to utilize three-dimensional coded formats in accordance with the invention. Although optical coding has been described in connection with a number of embodiments, it is to be understood that other forms of coding may be used, and that in such other forms of coding, "black" and "white" refer to the logic levels of which the coding form is comprised. Also, the code elements may have shapes other than those described herein. It is the applicants' intention to cover by the claims all such uses of the invention and all those changes and modifications which could be made to the embodiments of the invention herein chosen for the purpose of disclosure without departing from the spirit and scope of the invention. In the claims, terms such as obtain(ing), storing, processing, etc., information from coded objects, signals, coded information, etc., apply not only to information itself but to information related thereto or derived therefrom.

What is claimed is:

1. A counterfeit detection system for identifying a counterfeit object from a set of similar authentic objects, each object in said set having unique authorized information associated therewith comprised of machine-readable code elements coded according to a detectable series, the system comprising:
    means at a first facility for storing said authorized information;
    means at a plurality of facilities other than said first facility for machine-reading code elements from a similar object and providing information related to the machine-read code elements;
    means coupled to receive said information related to said code elements machine-read from said object for at least temporarily storing that information; and
    means at said first facility for detecting counterfeits coupled to said storing means and to said means for temporarily storing, said detecting means including a computer programmed to detect a counterfeit from information in said storing means at said first facility and from information received by said means for temporarily storing when information related to code elements machine read from a similar object is different from said authorized information.

2. The system according to claim 1, wherein there is no specific machine-readable starting point associated with a respective object for interpreting said code elements to obtain said information.

3. The system according to claim 1, wherein each of said objects has a plurality of machine-readable starting points associated therewith for interpreting said code elements to obtain said information.

4. The system according to claim 1, wherein said code elements associated with a respective object are repeated in whole or in part in one or more locations on each of said objects thereby repeating said given information in while or in part in said one or more locations.

5. The system according to claim 1, wherein each of said objects has associated therewith the same number of code elements.

6. The system according to claim 1, wherein said code elements are defined by machine-readable binary levels.

7. The system according to claim 1, including means for storing selected information corresponding to information on at least one object and means for detecting when information read from any object is the same as stored selected information.

8. The system according to claim 1, including means for detecting when information relating to said code elements machine read from a similar object is the same as information previously read from similar object, whereby a counterfeit may be detected.

9. The system of claim 1 wherein a said means for temporarily storing is provided at each of said plurality of facilities.

10. The system of claim 1 wherein said means for temporarily storing is provided at said first facility.

11. A counterfeit detection system for identifying a counterfeit object from a set of similar authentic objects, each object in said set having unique authorized information associated therewith comprised of machine-readable code elements coded according to a detectable series, the system comprising:
    means at a plurality of facilities for machine-reading code elements from a similar object and providing information related to the machine-read code elements;
    means coupled to receive said information related to said code elements machine-read from said object for at least temporarily storing that information; and
    means at a facility other than said plurality of facilities for detecting counterfeits coupled to said means for temporarily storing, said detecting means including a computer programmed to detect a counterfeit from information received by said means for temporarily storing when information related to code elements machine read from a similar object is the same as information previously read from another similar object.

12. A counterfeit detection system for identifying a counterfeit object from a set of similar authentic objects, each objects in said set having unique authorized information associated therewith comprised of machine-readable code elements coded according to a detectable series, the system comprising:
    means at a first facility for storing said authorized information;
    means at a plurality of facilities other than said firs facility for machine-reading code elements from a similar object and providing information related to the machine-read code elements;

means coupled to receive said information related to said code elements machine-read from said object for at least temporarily storing that information; and means at said first facility for detecting counterfeits coupled to said storing means and to said means for temporarily storing, said detecting means including a computer programmed to detect a counterfeit from information in said storing means at said first facility and from information received by said means for temporarily storing when information related to code elements machine read from a similar object is the same as authorized information associated with another similar object.

13. A counterfeit detection system for identifying a counterfeit object from a set of similar objects, each object in said set having unique randomly selected authorized information associated therewith comprised of machine-readable code elements, the system comprising:

means at a first facility for storing said randomly-selected authorized information;

means at a plurality of facilities other than said first facility for machine-reading code elements from an object and providing information related to the machine-read code elements;

means coupled to receive said information related to said code elements machine-read from said object for at least temporarily storing that information; and means at said first facility for detecting counterfeits coupled to said storing means and to said means for temporarily storing, said detecting means including a computer programmed to detect a counterfeit from information in said storing means at said first facility and from information received by said means for temporarily storing when information related to code elements machine read from an object is the same as information previously read from another object.

14. A counterfeit detection system for identifying a counterfeit object from a set of authentic objects, each object in said set having unique randomly selected authorized information associated therewith comprised of machine-readable code elements, the system comprising:

means at a first facility for storing said authorized information;

means at a plurality of facilities other than said first facility for machine-reading code elements from an object and providing information related to the machine-read code elements;

means coupled to receive said information related to said code elements machine-read from said object for at least temporarily storing that information; and means at said first facility for detecting counterfeits coupled to said storing means and to said means for temporarily storing, said detecting means including a computer programmed to detect a counterfeit from information in said storing means at said first facility and from information received by said means for temporarily storing when information related to code elements machine read from an object is the same as authorized information associated with another object.

15. A method of designating objects as authorized objects comprising:

randomly selecting m sets of unique authorized information from n sets of unique information, said n sets of unique information being a non-random series and m being substantially less than n, such that no given set of said m sets of unique authorized information is deducible from all or part of the remaining of said m sets of authorized information, n and m being integers and n being greater than one;

storing said m sets of authorized information; and applying said m sets of authorized information to respective authorized objects in a machine readable form.

16. The method according to claim 15 wherein said n sets of unique information are a detectable series.

* * * * *

REEXAMINATION CERTIFICATE (4174th)

United States Patent [19]
Storch et al.

[11] B1 5,283,422
[45] Certificate Issued Oct. 17, 2000

[54] INFORMATION TRANSFER AND USE, PARTICULARLY WITH RESPECT TO COUNTERFEIT DETECTION

[75] Inventors: Leonard Storch; Ernst van Haagen, both of New York, N.Y.

[73] Assignee: CIAS Inc., New York, N.Y.

Reexamination Request:
No. 90/005,308, Mar. 30, 1999

Reexamination Certificate for:
Patent No.: 5,283,422
Issued: Feb. 1, 1994
Appl. No.: 07/927,798
Filed: Aug. 10, 1992

Related U.S. Application Data

[63] Continuation of application No. 07/768,106, Sep. 30, 1991, abandoned, which is a continuation of application No. 07/292,569, Dec. 30, 1988, abandoned, which is a continuation of application No. 06/853,745, Apr. 18, 1986, Pat. No. 4,814,589.

[51] Int. Cl.[7] .............................. G06K 5/00; G06F 17/00
[52] U.S. Cl. ........................................... 235/375; 235/437
[58] Field of Search ..................................... 235/375, 437, 235/383, 381, 379, 385

[56] References Cited

U.S. PATENT DOCUMENTS 3,833,795  9/1974  Shoshani et al. .
4,373,134  2/1983  Grace et al. .

FOREIGN PATENT DOCUMENTS 1 184 658  3/1985  Canada .

OTHER PUBLICATIONS

IBM Technical Disclosure Bulletin, "Trip Ticket" vol. 17 No. 9, pp. 2768–2770 Feb. 1975.

*Primary Examiner*—Thien Minh Le

[57] ABSTRACT

Coding systems utilizing machine-readable coding are disclosed. The coding systems are extremely simple to use and preferred embodiments of the machine-readable coding require no external reference or reference code or starting point or orientation for reading or decoding. The number of usable codes for any given number of code elements (bits or digits) is maximized, or, conversely, a minimum number of code elements is required for a given application, thus allowing each code element to be of maximum size for a given coding area. Also, methods and apparatus for encoding objects, and for reading, decoding, processing and using the information obtained from such encoded objects are disclosed. The coding may be applied to objects such as casino chips, currency, automated production line components, consumer products, household items, zip coded objects, etc. The coding system and systems using the coding can be employed for enabling positive real-time detection of counterfeits (rather than mere counterfeit deterrence), cash monitoring, information gathering, object identification, etc., at minimum cost with maximum reliability and real-time speed. Preferred embodiments of systems concern round casino chips and paper money. Signals and data may be encoded independently of physical objects while obviating the need for any reference or synchronization in the coding.

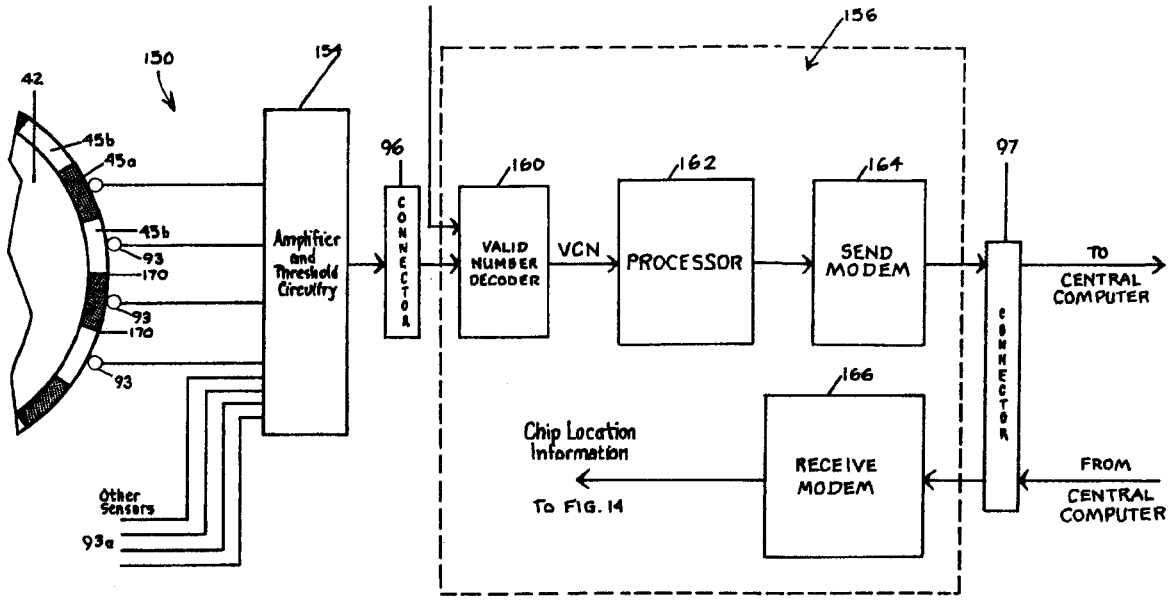

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–16 is confirmed.

Claim 8 is cancelled.

Claim 1 is determined to be patentable as amended.

Claims 2–7 and 9–10, dependent on an amended claim, are determined to be patentable.

1. A counterfeit detection system for identifying a counterfeit object from a set of similar authentic objects, each object in said set having unique authorized information associated therewith comprised of machine-readable code elements coded according to a detectable series, the system comprising:

means at a first facility for storing said authorized information;

means at a plurality of facilities other than said first facility for machine-reading code elements from a similar object and providing information related to the machine-read code elements;

means coupled to receive said information related to said code elements machine-read from said object for at least temporarily storing that information; [and]

means at said first facility for detecting counterfeits coupled to said storing means and to said means for temporarily storing, said detecting means including a computer programmed to detect a counterfeit from information in said storing means at said first facility and from information received by said means for temporarily storing when information related to code elements machine read from a similar object is different from said authorized information; *and*

*means for detecting when information relating to said code elements machine read from a similar object is the same as information previously read from a similar object, whereby a counterfeit may be detected.*

* * * * *